(12) United States Patent
Atkinson et al.

(10) Patent No.: US 12,499,863 B2
(45) Date of Patent: Dec. 16, 2025

(54) SYSTEMS AND METHODS FOR ACTIVE NOISE CANCELLATION

(71) Applicants: ResMed Pty Ltd, Bella Vista (AU); ResMed Sensor Technologies Limited, Dublin (IE)

(72) Inventors: Timothy Atkinson, Sydney (AU); Redmond Shouldice, Dublin (IE); Jeegarkumar Subhashchandra Kapadia, Sydney (AU)

(73) Assignee: RESMED PTY LTD, Bella Vista (AU)

( * ) Notice: Subject to any disclaimer, the term of this patent is extended or adjusted under 35 U.S.C. 154(b) by 562 days.

(21) Appl. No.: 17/439,389

(22) PCT Filed: Oct. 30, 2020

(86) PCT No.: PCT/IB2020/060226
§ 371 (c)(1),
(2) Date: Sep. 14, 2021

(87) PCT Pub. No.: WO2021/084501
PCT Pub. Date: May 6, 2021

(65) Prior Publication Data
US 2022/0192592 A1    Jun. 23, 2022

Related U.S. Application Data

(60) Provisional application No. 62/929,065, filed on Oct. 31, 2019.

(51) Int. Cl.
*G10K 11/178*    (2006.01)
*A61B 5/00*    (2006.01)
(Continued)

(52) U.S. Cl.
CPC ............ *G10K 11/178* (2013.01); *A61B 5/024* (2013.01); *A61B 5/0816* (2013.01); *A61B 5/11* (2013.01);
(Continued)

(58) Field of Classification Search
CPC ...... G10K 11/178; G16H 20/40; G16H 40/63; G16H 50/30; A61B 5/024; A61B 5/0816;
(Continued)

(56) References Cited

U.S. PATENT DOCUMENTS

| | | | |
|---|---|---|---|
| 5,503,146 A * | 4/1996 | Froehlich .......... | A61M 16/0069 128/204.23 |
| 6,431,171 B1 * | 8/2002 | Burton ................ | A61M 16/024 128/204.22 |

(Continued)

FOREIGN PATENT DOCUMENTS

| CN | 102512138 A | 6/2012 |
|---|---|---|
| CN | 104706423 A | 6/2015 |

(Continued)

OTHER PUBLICATIONS

International Search Report in International Patent Application No. PCT/IB2020/060226 mailed Feb. 10, 2021 (4 pp.).

(Continued)

*Primary Examiner* — Tu A Vo
*Assistant Examiner* — Kelsey E Baller
(74) *Attorney, Agent, or Firm* — Nixon Peabody LLP

(57) ABSTRACT

A method for canceling noises generated by a respiratory system that is configured to supply pressurized air to a user during a sleep session comprises generating sound data using a microphone; generating, using or one or more sensors, respiration data associated with respiration of the user of the respiratory system; analyzing the sound data to determine if noise associated with operation of the respira- (Continued)

tory system is occurring; and causing a speaker to emit sound waves based at least in part on (i) the sound data, (ii) the respiration data, (iii) data related to the operation of the respiratory system, or (iv) any combination of (i), (ii), and (iii), the emitted sound waves being configured to acoustically cancel at least a portion of the noise associated with operation of the respiratory system.

32 Claims, 11 Drawing Sheets

(51) Int. Cl.
| | | |
|---|---|---|
| *A61B 5/024* | (2006.01) | |
| *A61B 5/08* | (2006.01) | |
| *A61B 5/11* | (2006.01) | |
| *A61M 16/00* | (2006.01) | |
| *A61M 16/16* | (2006.01) | |
| *G16H 20/40* | (2018.01) | |
| *G16H 40/63* | (2018.01) | |
| *G16H 50/30* | (2018.01) | |

(52) U.S. Cl.
CPC .......... *A61B 5/4809* (2013.01); *A61B 5/4812* (2013.01); *A61M 16/0057* (2013.01); *A61M 16/024* (2017.08); *A61M 16/161* (2014.02); *G16H 20/40* (2018.01); *G16H 40/63* (2018.01); *G16H 50/30* (2018.01); *A61M 2016/0027* (2013.01); *A61M 2016/0033* (2013.01); *A61M 2205/3313* (2013.01); *A61M 2205/332* (2013.01); *A61M 2205/3375* (2013.01); *A61M 2205/3553* (2013.01); *A61M 2205/3569* (2013.01); *A61M 2205/3584* (2013.01); *A61M 2205/3592* (2013.01); *A61M 2205/42* (2013.01); *A61M 2205/505* (2013.01); *A61M 2205/52* (2013.01); *A61M 2230/04* (2013.01); *A61M 2230/10* (2013.01); *A61M 2230/14* (2013.01); *A61M 2230/30* (2013.01); *A61M 2230/432* (2013.01); *A61M 2230/50* (2013.01); *A61M 2230/60* (2013.01); *A61M 2230/63* (2013.01); *A61M 2230/65* (2013.01)

(58) Field of Classification Search
CPC ....... A61B 5/11; A61B 5/4809; A61B 5/4812; A61M 16/0057; A61M 16/024; A61M 16/161; A61M 2016/0027; A61M 2016/0033; A61M 2205/3313; A61M 2205/332; A61M 2205/3375; A61M 2205/3553; A61M 2205/3569; A61M 2205/3584; A61M 2205/3592; A61M 2205/42; A61M 2205/505; A61M 2205/52; A61M 2230/04; A61M 2230/10; A61M 2230/14; A61M 2230/30; A61M 2230/432; A61M 2230/50; A61M 2230/60; A61M 2230/63; A61M 2230/65; A61M 2230/40

See application file for complete search history.

(56) References Cited

U.S. PATENT DOCUMENTS

| | | | |
|---|---|---|---|
| 2004/0189475 A1* | 9/2004 | Cooper | A61B 5/6892 340/573.1 |
| 2008/0110459 A1* | 5/2008 | Farbarik | A61M 16/026 128/204.18 |
| 2009/0203972 A1* | 8/2009 | Heneghan | A61B 5/0816 600/301 |
| 2011/0247620 A1 | 10/2011 | Armstrong et al. | |
| 2014/0088373 A1* | 3/2014 | Phillips | A61B 5/05 600/301 |
| 2014/0123977 A1* | 5/2014 | Lalonde | A61M 16/06 128/204.23 |
| 2014/0166007 A1 | 6/2014 | Bordewick et al. | |
| 2014/0169579 A1* | 6/2014 | Azmi | H04R 1/1083 381/71.6 |
| 2014/0373845 A1* | 12/2014 | Dong | A61M 16/026 128/204.23 |
| 2015/0258301 A1* | 9/2015 | Trivedi | A61B 5/0024 600/28 |
| 2017/0196761 A1* | 7/2017 | Hyde | A61M 16/0069 |
| 2019/0175962 A1* | 6/2019 | Su | A61M 16/026 |
| 2020/0069088 A1* | 3/2020 | Kim | G10K 11/17857 |
| 2020/0367810 A1* | 11/2020 | Shouldice | H04R 1/08 |

FOREIGN PATENT DOCUMENTS

| | | |
|---|---|---|
| WO | 2018050913 A1 | 3/2018 |
| WO | 2019122412 A1 | 6/2019 |
| WO | 2020264427 A1 | 12/2020 |

OTHER PUBLICATIONS

Written Opinion in International Patent Application No. PCT/IB2020/060226 mailed Feb. 10, 2021 (6 pp.).

* cited by examiner

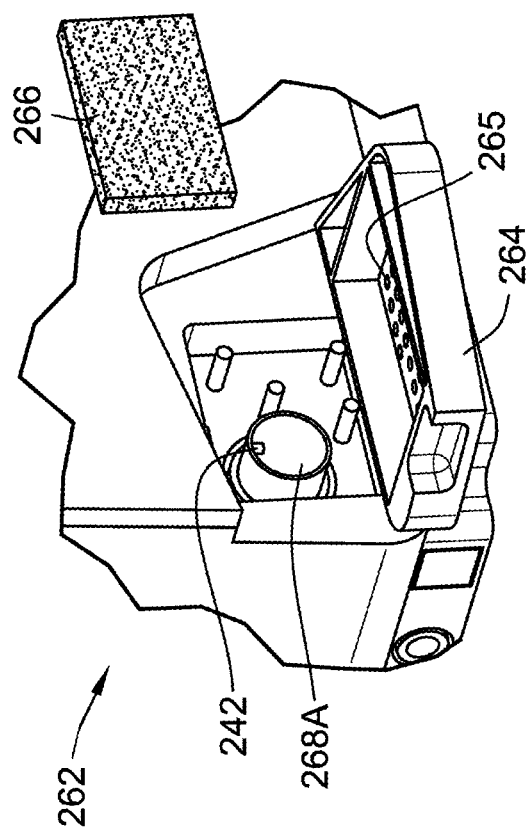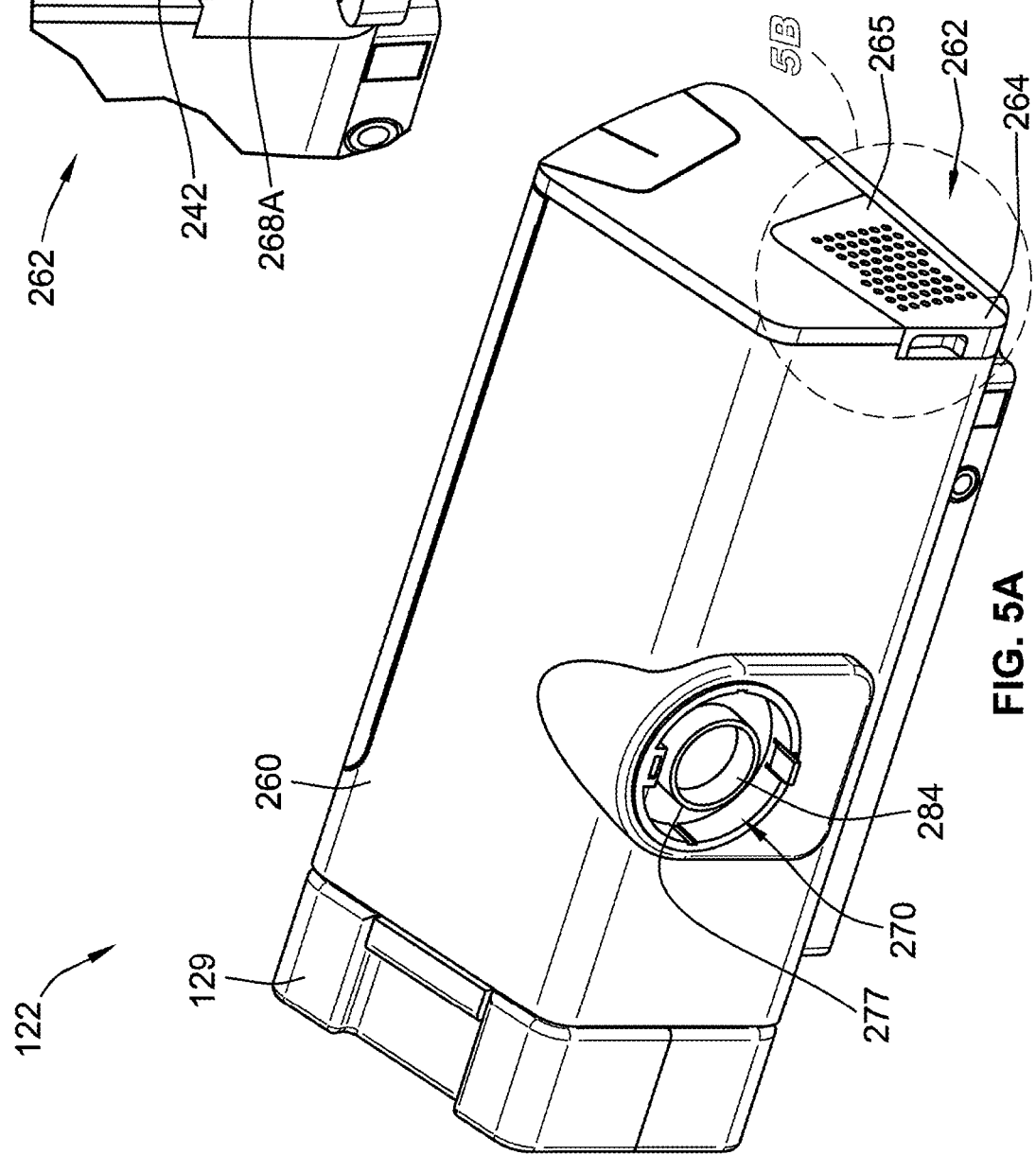

SYSTEMS AND METHODS FOR ACTIVE NOISE CANCELLATION

CROSS-REFERENCE TO RELATED APPLICATIONS

This application is a U.S. National Stage of International Application No. PCT/IB2020/060226, filed Oct. 30, 2020, which claims the benefit of, and priority to, U.S. Provisional Patent Application No. 62/929,065 filed on Oct. 31, 2019, each of which is hereby incorporated by reference herein in its entirety.

TECHNICAL FIELD

The present disclosure relates generally to systems and methods for canceling noise, and more particularly, to systems and methods for detecting noise associated with operation and/or use of a respiratory system and emitting cancellation sound waves that acoustically cancel the noise.

BACKGROUND

Many individuals suffer from sleep-related respiratory disorders associated with one or more events that occur during sleep, such as, for example, snoring, an apnea, a hypopnea, a restless leg, a sleeping disorder, choking, an increased heart rate, labored breathing, an asthma attack, an epileptic episode, a seizure, or any combination thereof. These individuals are often treated using a respiratory therapy system (e.g., a continuous positive airway pressure (CPAP) system), which delivers pressurized air to aid in preventing the individual's airway from narrowing or collapsing during sleep. The respiratory therapy system can generate physiological data associated with a sleep session, which in turn can be used to determine sleep-related parameters and/or generate reports indicative of sleep quality. However, such respiratory therapy systems can make noise during operation (motor noise, user interface leaking noise, vent leaking noise, etc.), which can bother the user and/or a bed partner of the user. Such audible noise can increase the difficulty in falling asleep, and can generally decrease the quality of the user's sleep. The present disclosure is directed to solving these and other problems.

SUMMARY

According to some implementations of the present disclosure, a method for canceling noises generated by a respiratory system that is configured to supply pressurized air to a user during a sleep session includes generating sound data using a microphone. The method also includes generating, using or one or more sensors, respiration data associated with respiration of the user of the respiratory system. The method also includes analyzing the sound data to determine if noise associated with operation of a respiratory system is occurring. The method also includes causing a speaker to emit sound waves based at least in part on (i) the sound data, (ii) the respiration data, (iii) one or more physical characteristics of the respirator device, or (iv) any combination of (i), (ii), and (iii). The emitted sound waves are configured to acoustically cancel at least a portion of the noise associated with operation of the respiratory system.

According to some implementations of the present disclosure, a method for canceling noises generated by a respiratory system that is configured to supply pressurized air to a user during a sleep session includes generating sound data using a microphone. The method also includes generating, using or one or more sensors, respiration data associated with respiration of the user of the respiratory system. The method also includes analyzing the sound data to determine if noise associated with operation of a respiratory system is occurring. The method also includes causing a speaker to emit sound waves based at least in part on (i) the sound data, (ii) the respiration data, (iii) one or more physical characteristics of the respirator device, or (iv) any combination of (i), (ii), and (iii). The emitted sound waves are configured to acoustically cancel at least a portion of the noise associated with operation of the respiratory system. The sound waves are emitted when the user is in a first stage of the sleep session, but not in a second stage of the sleep session.

According to some implementations of the present disclosure, a method for canceling noises generated by a respiratory system that is configured to supply pressurized air to a user during a sleep session includes generating sound data using a microphone. The method also includes generating, using or one or more sensors, respiration data associated with respiration of the user of the respiratory system. The method also includes analyzing the sound data to determine if noise associated with operation of a respiratory system is occurring. The method also includes causing a speaker to emit sound waves based at least in part on (i) the sound data, (ii) the respiration data, (iii) one or more physical characteristics of the respirator device, or (iv) any combination of (i), (ii), and (iii). The emitted sound waves are configured to acoustically cancel at least a portion of the noise associated with operation of the respiratory system. The method also includes receiving feedback sound data, and modifying, based at least in part on the received feedback sound data, the one or more sound waves being emitted by the speaker.

According to some implementations of the present disclosure, a method for canceling noises generated by a respiratory system that is configured to supply pressurized air to a user during a sleep session includes generating sound data using a microphone. The method also includes generating, using or one or more sensors, respiration data associated with respiration of the user of the respiratory system. The method also includes analyzing the sound data to determine if noise associated with operation of a respiratory system is occurring. The method also includes causing a speaker to emit sound waves based at least in part on (i) the sound data, (ii) the respiration data, (iii) one or more physical characteristics of the respirator device, or (iv) any combination of (i), (ii), and (iii). The emitted sound waves are configured to acoustically cancel at least a portion of the noise associated with operation of the respiratory system. The method also includes predicting a future change in the noise associated with operation of the respiratory system based at least in part on (i) the sound data, (ii) the respiration data, (iii) data related to the operation of the respiratory system, or (iv) any combination of (i), (ii), and (iii). The method also includes modifying the sound waves emitted by the speaker based at least in part on the predicted future change in the noise associated with operation of the respiratory system.

According to some implementations of the present disclosure, a system comprises a respiratory system, a microphone, and a speaker. The respiratory system includes a respiratory device. The respiratory device is configured to supply pressurized air to an airway of a user. The respiratory device is configured for attachment to a user interface via a conduit. The respiratory device, the user interface, and the conduit form an air pathway so that, when the user interface is coupled to a face of the user, the supplied pressurized air is directed to an airway of a user. The microphone is configured to generate sound data representative of noise associated with operation of the respiratory system. The speaker is configured to emit sound waves. The sound waves are configured to acoustically cancel at least a portion of the noise associated with operation of the respiratory system.

The above summary is not intended to represent each embodiment or every aspect of the present invention. Additional features and benefits of the present invention are apparent from the detailed description and figures set forth below.

BRIEF DESCRIPTION OF THE DRAWINGS

FIG. 5A is a rear perspective view of a respiratory device of the system of FIG. 1, according to some implementations of the present disclosure;

FIG. 5B is a zoomed-in partial rear perspective view of the respiratory device of FIG. 5A showing an air inlet area of the respiratory device, according to some implementations of the present disclosure;

Figure 1:
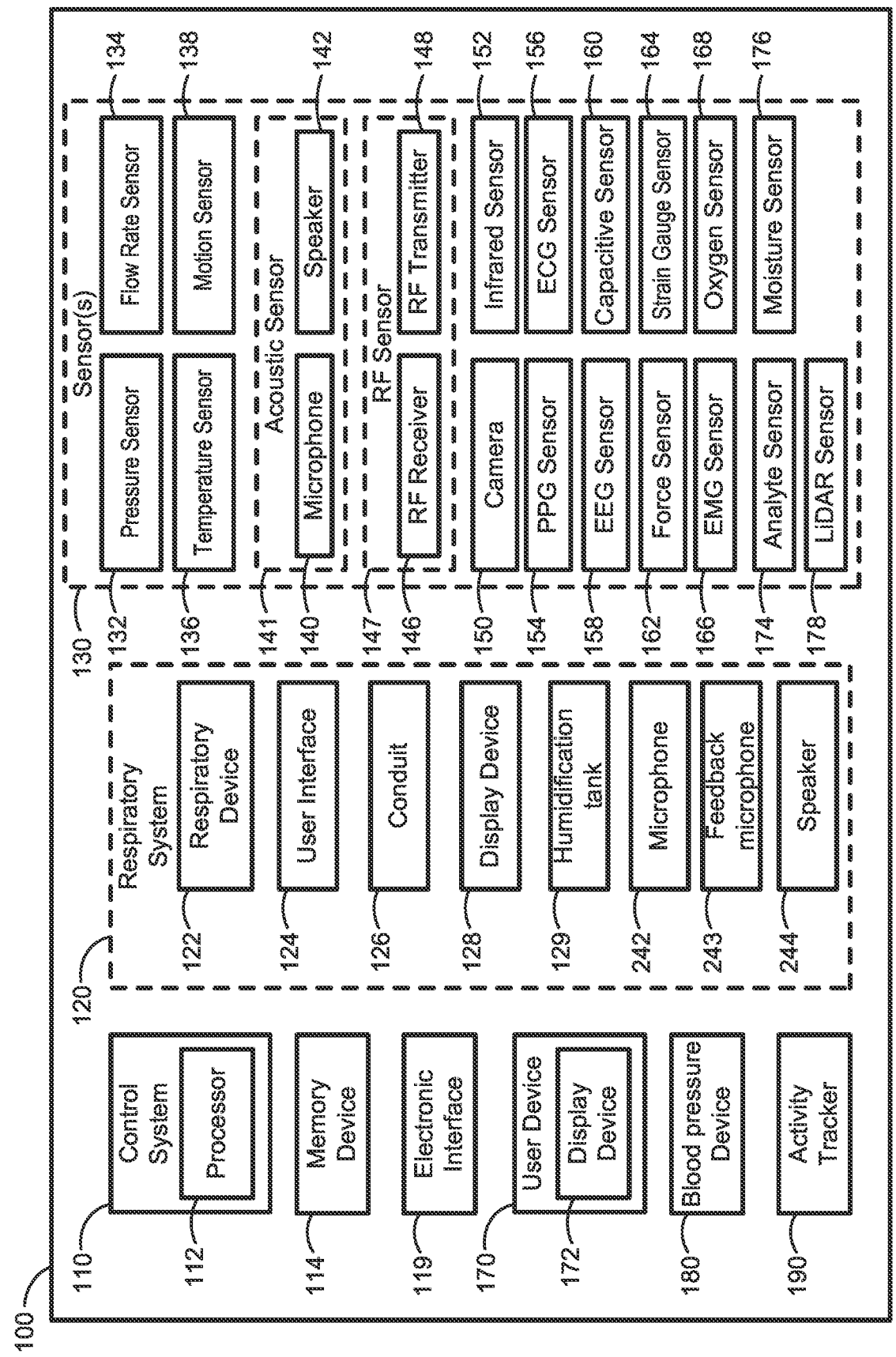
FIG. 1 is a functional block diagram of a system for canceling noise associated with operation of a respiratory system that includes a respiratory device, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

Many individuals suffer from sleep-related and/or respiratory disorders. Examples of sleep-related and/or respiratory disorders include Periodic Limb Movement Disorder (PLMD), Restless Leg Syndrome (RLS), Sleep-Disordered Breathing (SDB), Obstructive Sleep Apnea (OSA), Central Sleep Apnea (CSA), other types of apneas, Cheyne-Stokes Respiration (CSR), respiratory insufficiency, Obesity Hyperventilation Syndrome (OHS), Chronic Obstructive Pulmonary Disease (COPD), Neuromuscular Disease (NMD), and chest wall disorders.

Obstructive Sleep Apnea (OSA) is a form of Sleep Disordered Breathing (SDB), and is characterized by events including occlusion or obstruction of the upper air passage during sleep resulting from a combination of an abnormally small upper airway and the normal loss of muscle tone in the region of the tongue, soft palate and posterior oropharyngeal wall. Central Sleep Apnea (CSA) is another form of SDB that results when the brain temporarily stops sending signals to the muscles that control breathing. More generally, an apnea generally refers to the cessation of breathing caused by blockage of the air or the stopping of the breathing function. Typically, the individual will stop breathing for between about 15 seconds and about 30 seconds during an obstructive sleep apnea event.

Other types of apneas include hypopnea, hyperpnea, and hypercapnia. Hypopnea is generally characterized by slow or shallow breathing caused by a narrowed airway, as opposed to a blocked airway. Hyperpnea is generally characterized by an increase depth and/or rate of breathing. Hypercapnia is generally characterized by elevated or excessive carbon dioxide in the bloodstream, typically caused by inadequate respiration.

Cheyne-Stokes Respiration (CSR) is another form of SDB. CSR is a disorder of a patient's respiratory controller in which there are rhythmic alternating periods of waxing and waning ventilation known as CSR cycles. CSR is characterized by repetitive de-oxygenation and re-oxygenation of the arterial blood.

Obesity Hyperventilation Syndrome (OHS) is defined as the combination of severe obesity and awake chronic hypercapnia, in the absence of other known causes for hypoventilation. Symptoms include dyspnea, morning headache and excessive daytime sleepiness.

Chronic Obstructive Pulmonary Disease (COPD) encompasses any of a group of lower airway diseases that have certain characteristics in common, such as increased resistance to air movement, extended expiratory phase of respiration, and loss of the normal elasticity of the lung.

Neuromuscular Disease (NMD) encompasses many diseases and ailments that impair the functioning of the muscles either directly via intrinsic muscle pathology, or indirectly via nerve pathology. Chest wall disorders are a group of thoracic deformities that result in inefficient coupling between the respiratory muscles and the thoracic cage.

These and other disorders are characterized by particular events (e.g., snoring, an apnea, a hypopnea, a restless leg, a sleeping disorder, choking, an increased heart rate, labored breathing, an asthma attack, an epileptic episode, a seizure, or any combination thereof) that occur when the individual is sleeping.

The Apnea-Hypopnea Index (AHI) is an index used to indicate the severity of sleep apnea during a sleep session. The AHI is calculated by dividing the number of apnea and/or hypopnea events experienced by the user during the sleep session by the total number of hours of sleep in the sleep session. The event can be, for example, a pause in breathing that lasts for at least 10 seconds. An AHI that is less than 5 is considered normal. An AHI that is greater than or equal to 5, but less than 15 is considered indicative of mild sleep apnea. An AHI that is greater than or equal to 15, but less than 30 is considered indicative of moderate sleep apnea. An AHI that is greater than or equal to 30 is considered indicative of severe sleep apnea. In children, an AHI that is greater than 1 is considered abnormal. Sleep apnea can be considered "controlled" when the AHI is normal, or when the AHI is normal or mild. The AHI can also be used in combination with oxygen desaturation levels to indicate the severity of Obstructive Sleep Apnea.

Referring to FIG. 1, a system 100, according to some implementations of the present disclosure, is illustrated. The system 100 includes a control system 110, a memory device 114, an electronic interface 119, a respiratory system 120, a microphone 242, and a speaker 244. In some implementations, the system 100 also includes a feedback microphone 243. In some implementations, the system 100 further includes one or more sensors 130, one or more external devices 170, a blood pressure device 180, an activity tracker 190, or any combination thereof. The system 100 can be used for active cancelation of noises produced during operation of the respiratory system 120.

The control system 110 includes one or more processors 112 (hereinafter, processor 112). The control system 110 is generally used to control (e.g., actuate) the various components of the system 100 and/or analyze data obtained and/or generated by the components of the system 100. The processor 112 can be a general or special purpose processor or microprocessor. While one processor 112 is shown in FIG. 1, the control system 110 can include any suitable number of processors (e.g., one processor, two processors, five processors, ten processors, etc.) that can be in a single housing, or located remotely from each other. The control system 110 can be coupled to and/or positioned within, for example, a housing of the external device 170, and/or within a housing of one or more of the sensors 130. The control system 110 can be centralized (within one such housing) or decentralized (within two or more of such housings, which are physically distinct). In such implementations including two or more housings containing the control system 110, such housings can be located proximately and/or remotely from each other.

The memory device 114 stores machine-readable instructions that are executable by the processor 112 of the control system 110. The memory device 114 can be any suitable computer readable storage device or media, such as, for example, a random or serial access memory device, a hard drive, a solid state drive, a flash memory device, etc. While one memory device 114 is shown in FIG. 1, the system 100 can include any suitable number of memory devices 114 (e.g., one memory device, two memory devices, five memory devices, ten memory devices, etc.). The memory device 114 can be coupled to and/or positioned within a housing of any one or more of the sensors 130. Like the control system 110, the memory device 114 can be centralized (within one such housing) or decentralized (within two or more of such housings, which are physically distinct).

In some implementations, the memory device 114 (FIG. 1) stores a user profile associated with the user. The user profile can include, for example, demographic information associated with the user, biometric information associated with the user, medical information associated with the user, self-reported user feedback, sleep parameters associated with the user (e.g., sleep-related parameters recorded from one or more earlier sleep sessions), or any combination thereof. The demographic information can include, for example, information indicative of an age of the user, a gender of the user, a race of the user, a family medical history, an employment status of the user, an educational status of the user, a socioeconomic status of the user, or any combination thereof. The medical information can include, for example, information indicative of one or more medical conditions associated with the user, medication usage by the user, or both. The medical information data can further include a multiple sleep latency test (MSLT) test result or score and/or a Pittsburgh Sleep Quality Index (PSQI) score or value. The self-reported user feedback can include information indicative of a self-reported subjective sleep score (e.g., poor, average, excellent), a self-reported subjective stress level of the user, a self-reported subjective fatigue level of the user, a self-reported subjective health status of the user, a recent life event experienced by the user, or any combination thereof.

The electronic interface 119 is configured to receive data (e.g., physiological and/or audio data) from the one or more sensors 130 such that the data can be stored in the memory device 114 and/or analyzed by the processor 112 of the control system 110. The electronic interface 119 can communicate with the one or more sensors 130 using a wired connection or a wireless connection (e.g., using an RF communication protocol, a WiFi communication protocol, a Bluetooth communication protocol, an IR communication protocol, over a cellular network, over any other optical communication protocol, etc.). The electronic interface 119 can include an antenna, a receiver (e.g., an RF receiver), a transmitter (e.g., an RF transmitter), a transceiver, or any combination thereof. The electronic interface 119 can also include one more processors and/or one more memory devices that are the same as, or similar to, the processor 112 and the memory device 114 described herein. In some implementations, the electronic interface 119 is coupled to or integrated in the external device 170. In other implementations, the electronic interface 119 is coupled to or integrated (e.g., in a housing) with the control system 110 and/or the memory device 114.

As noted above, in some implementations, the system 100 optionally includes a respiratory system 120 (also referred to as a respiratory therapy system). The respiratory system 120 can include a respiratory device 122 (also referred to as a respiratory pressure therapy device), a user interface 124, a conduit 126 (also referred to as a tube or an air circuit), a display device 128, a humidification tank 129, or any combination thereof. In some implementations, the control system 110, the memory device 114, the display device 128, one or more of the sensors 130, and the humidification tank 129 are part of the respiratory device 122. Respiratory pressure therapy refers to the application of a supply of air to an entrance to a user's airways at a controlled target pressure that is nominally positive with respect to atmosphere throughout the user's breathing cycle (e.g., in contrast to negative pressure therapies such as the tank ventilator or cuirass). The respiratory system 120 is generally used to treat individuals suffering from one or more sleep-related respiratory disorders (e.g., obstructive sleep apnea, central sleep apnea, or mixed sleep apnea), other respiratory disorders such as COPD, or other disorders leading to respiratory insufficiency, that may manifest either during sleep or wakefulness.

The respiratory device 122 is generally used to generate pressurized air that is delivered to a user (e.g., using one or more motors that drive one or more compressors). In some implementations, the respiratory device 122 generates continuous constant air pressure that is delivered to the user. In other implementations, the respiratory device 122 generates two or more predetermined pressures (e.g., a first predetermined air pressure and a second predetermined air pressure). In still other implementations, the respiratory device 122 is configured to generate a variety of different air pressures within a predetermined range. For example, the respiratory device 122 can deliver at least about 6 cm $H_2O$, at least about 10 cm $H_2O$, at least about 20 cm $H_2O$, between about 6 cm $H_2O$ and about 10 cm $H_2O$, between about 7 cm $H_2O$ and about 12 cm $H_2O$, etc. The respiratory device 122 can also deliver pressurized air at a predetermined flow rate between, for example, about −20 L/min and about 150 L/min, while maintaining a positive pressure (relative to the ambient pressure). In some implementations, the control system 110, the memory device 114, the electronic interface 119, or any combination thereof can be coupled to and/or positioned within a housing of the respiratory device 122.

The user interface 124 engages a portion of the user's face and delivers pressurized air from the respiratory device 122 to the user's airway to aid in preventing the airway from narrowing and/or collapsing during sleep. This may also increase the user's oxygen intake during sleep. Depending upon the therapy to be applied, the user interface 124 may form a seal, for example, with a region or portion of the user's face, to facilitate the delivery of gas at a pressure at sufficient variance with ambient pressure to effect therapy, for example, at a positive pressure of about 10 cm $H_2O$ relative to ambient pressure. For other forms of therapy, such as the delivery of oxygen, the user interface may not include a seal sufficient to facilitate delivery to the airways of a supply of gas at a positive pressure of about 10 cm $H_2O$.

Figure 2:
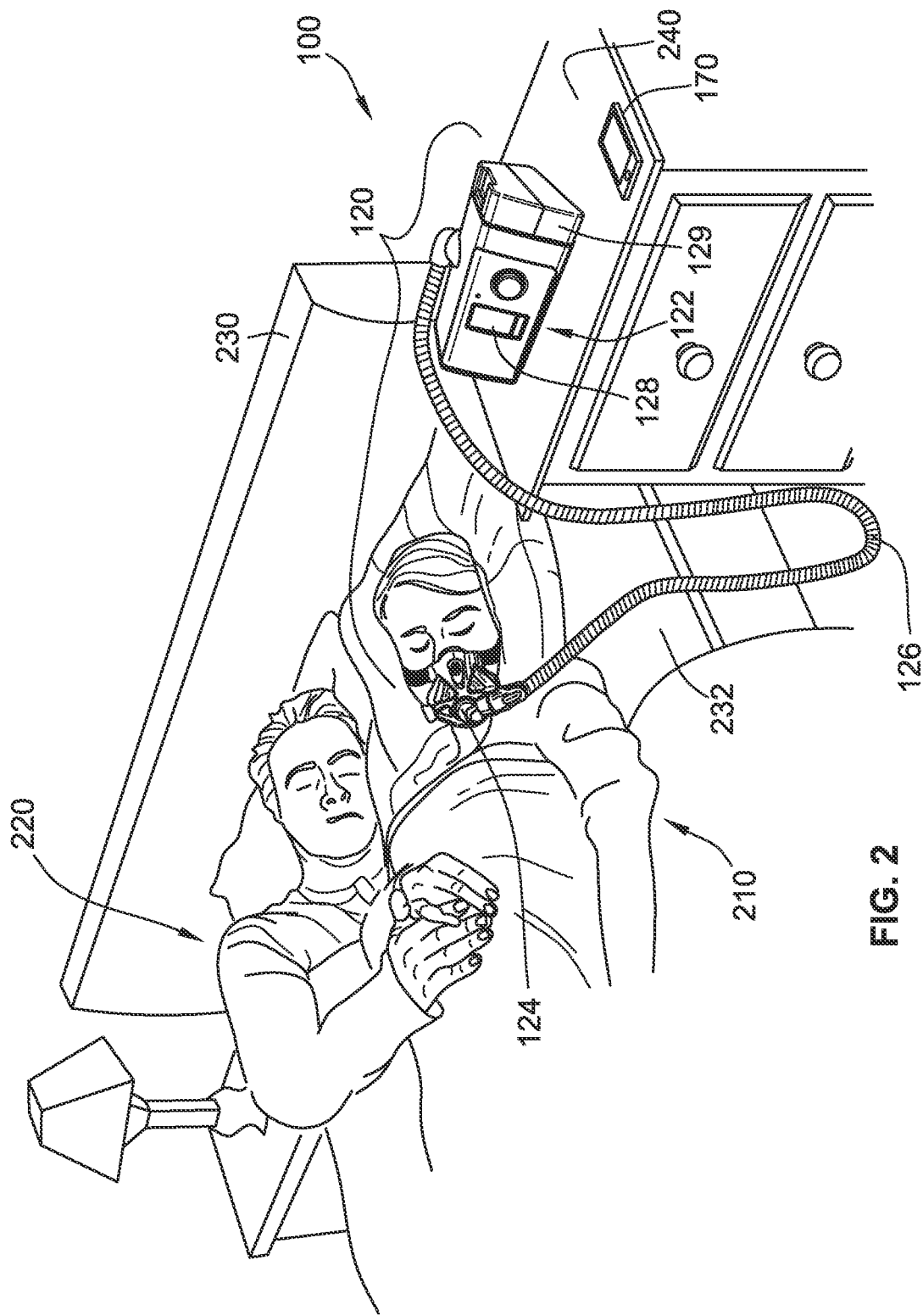
FIG. 2 is a perspective view of the system of FIG. 1, a user of the system, and a bed partner of the user, according to some implementations of the present disclosure.

As shown in FIG. 2, in some implementations, the user interface 124 is or includes a facial mask that covers the nose and mouth of the user. Alternatively, the user interface 124 is or includes a nasal mask that provides air to the nose of the user or a nasal pillow mask that delivers air directly to the nostrils of the user. The user interface 124 can include a strap assembly that has a plurality of straps (e.g., including hook and loop fasteners) for positioning and/or stabilizing the user interface 124 on a portion of the user interface 124 on a desired location of the user (e.g., the face), and a conformal cushion (e.g., silicone, plastic, foam, etc.) that aids in providing an air-tight seal between the user interface 124 and the user. The user interface 124 can also include one or more vents for permitting the escape of carbon dioxide and other gases exhaled by the user 210. In other implementations, the user interface 124 includes a mouthpiece (e.g., a night guard mouthpiece molded to conform to the user's teeth, a mandibular repositioning device, etc.).

The conduit 126 allows the flow of air between two components of a respiratory system 120, such as the respiratory device 122 and the user interface 124. In some implementations, there can be separate limbs of the conduit for inhalation and exhalation. In other implementations, a single limb conduit is used for both inhalation and exhalation.

One or more of the respiratory device 122, the user interface 124, the conduit 126, the display device 128, and the humidification tank 129 can contain one or more sensors (e.g., a pressure sensor, a flow rate sensor, or more generally any of the other sensors 130 described herein). These one or more sensors can be used, for example, to measure the air pressure and/or flow rate of pressurized air supplied by the respiratory device 122.

The display device 128 is generally used to display image(s) including still images, video images, or both and/or information regarding the respiratory device 122. For example, the display device 128 can provide information regarding the status of the respiratory device 122 (e.g., whether the respiratory device 122 is on/off, the pressure of the air being delivered by the respiratory device 122, the temperature of the air being delivered by the respiratory device 122, etc.) and/or other information (e.g., a sleep score or a therapy score (also referred to as a myAir™ score), the current date/time, personal information for the user 210, etc.). In some implementations, the display device 128 acts as a human-machine interface (HMI) that includes a graphic user interface (GUI) configured to display the image(s) as an input interface. The display device 128 can be an LED display, an OLED display, an LCD display, or the like. The input interface can be, for example, a touchscreen or touch-sensitive substrate, a mouse, a keyboard, or any sensor system configured to sense inputs made by a human user interacting with the respiratory device 122.

The humidification tank 129 is coupled to or integrated in the respiratory device 122 and includes a reservoir of water that can be used to humidify the pressurized air delivered from the respiratory device 122. The respiratory device 122 can include a heater to heat the water in the humidification tank 129 in order to humidify the pressurized air provided to the user. Additionally, in some implementations, the conduit 126 can also include a heating element (e.g., coupled to and/or imbedded in the conduit 126) that heats the pressurized air delivered to the user. In other implementations, the respiratory device 122 or the conduit 126 can include a waterless humidifier. The waterless humidifier can incorporate sensors that interface with other sensor positioned elsewhere in system 100.

The respiratory system 120 can be used, for example, as a ventilator or a positive airway pressure (PAP) system, such as a continuous positive airway pressure (CPAP) system, an automatic positive airway pressure system (APAP), a bi-level or variable positive airway pressure system (BPAP or VPAP), or any combination thereof. The CPAP system delivers a predetermined air pressure (e.g., determined by a sleep physician) to the user. The APAP system automatically varies the air pressure delivered to the user based at least in part on, for example, respiration data associated with the user. The BPAP or VPAP system is configured to deliver a first predetermined pressure (e.g., an inspiratory positive airway pressure or IPAP) and a second predetermined pressure (e.g., an expiratory positive airway pressure or EPAP) that is lower than the first predetermined pressure.

Referring to FIG. 2, a portion of the system 100 (FIG. 1), according to some implementations, is illustrated. A user 210 of the respiratory system 120 and a bed partner 220 are located in a bed 230 and are laying on a mattress 232. The user interface 124 (e.g., a full facial mask) can be worn by the user 210 during a sleep session. The user interface 124 is fluidly coupled and/or connected to the respiratory device 122 via the conduit 126. In turn, the respiratory device 122 delivers pressurized air to the user 210 via the conduit 126 and the user interface 124 to increase the air pressure in the throat of the user 210 to aid in preventing the airway from closing and/or narrowing during sleep. The respiratory device 122 can be positioned on a nightstand 240 that is directly adjacent to the bed 230 as shown in FIG. 2, or more generally, on any surface or structure that is generally adjacent to the bed 230 and/or the user 210.

Referring to back to FIG. 1, the one or more sensors 130 of the system 100 include a pressure sensor 132, a flow rate sensor 134, temperature sensor 136, a motion sensor 138, a microphone 140, a speaker 142, a radio-frequency (RF) receiver 146, a radio-frequency (RF) transmitter 148, a camera 150, an infrared (IR) sensor 152, a photoplethysmogram (PPG) sensor 154, an electrocardiogram (ECG) sensor 156, an electroencephalography (EEG) sensor 158, a capacitive sensor 160, a force sensor 162, a strain gauge sensor 164, an electromyography (EMG) sensor 166, an oxygen sensor 168, an analyte sensor 174, a moisture sensor 176, a light detection and ranging (LiDAR) sensor 178, or any combination thereof. Generally, each of the one or sensors 130 are configured to output sensor data that is received and stored in the memory device 114 or one or more other memory devices. The sensors 130 can also include, an electrooculography (EOG) sensor, a peripheral oxygen saturation ($SpO_2$) sensor, a galvanic skin response (GSR) sensor, a carbon dioxide ($CO_2$) sensor, or any combination thereof.

While the one or more sensors 130 are shown and described as including each of the pressure sensor 132, the flow rate sensor 134, the temperature sensor 136, the motion sensor 138, the microphone 140, the speaker 142, the RF receiver 146, the RF transmitter 148, the camera 150, the IR sensor 152, the PPG sensor 154, the ECG sensor 156, the EEG sensor 158, the capacitive sensor 160, the force sensor 162, the strain gauge sensor 164, the EMG sensor 166, the oxygen sensor 168, the analyte sensor 174, the moisture sensor 176, and the LidAR sensor 178, more generally, the one or more sensors 130 can include any combination and any number of each of the sensors described and/or shown herein.

The one or more sensors 130 can be used to generate, for example physiological data, audio data, or both. Physiological data generated by one or more of the sensors 130 can be used by the control system 110 to determine a sleep-wake signal associated with a user during the sleep session and one or more sleep-related parameters. The sleep-wake signal can be indicative of one or more sleep stages, including sleep, wakefulness, relaxed wakefulness, micro-awakenings, or distinct sleep stages such as a rapid eye movement (REM) stage, a first non-REM stage (often referred to as "N1"), a second non-REM stage (often referred to as "N2"), a third non-REM stage (often referred to as "N3"), or any combination thereof.

The sleep-wake signal can also be timestamped to indicate a time that the user enters the bed, a time that the user exits the bed, a time that the user attempts to fall asleep, etc. The sleep-wake signal can be measured one or more of the sensors 130 during the sleep session at a predetermined sampling rate, such as, for example, one sample per second, one sample per 30 seconds, one sample per minute, etc. Examples of the one or more sleep-related parameters that can be determined for the user during the sleep session based at least in part on the sleep-wake signal include a total time in bed, a total sleep time, a total wake time, a sleep onset latency, a wake-after-sleep-onset parameter, a sleep efficiency, a fragmentation index, an amount of time to fall asleep, a consistency of breathing rate, a fall asleep time, a wake time, a rate of sleep disturbances, a number of movements, or any combination thereof.

Physiological data and/or audio data generated by the one or more sensors 130 can also be used to determine a respiration signal associated with a user during a sleep session. the respiration signal is generally indicative of respiration or breathing of the user during the sleep session. The respiration signal can be indicative of, for example, a respiration rate, a respiration rate variability, an inspiration amplitude, an expiration amplitude, an inspiration-expiration amplitude ratio, an inspiration-expiration duration ratio, a number of events per hour, a pattern of events, pressure settings of the respiratory device 122, or any combination thereof. The event(s) can include snoring, apneas, central apneas, obstructive apneas, mixed apneas, hypopneas, a mask leak (e.g., from the user interface 124), a restless leg, a sleeping disorder, choking, an increased heart rate, a heart rate variation, labored breathing, an asthma attack, an epileptic episode, a seizure, a fever, a cough, a sneeze, a snore, a gasp, the presence of an illness such as the common cold or the flu, an elevated stress level, etc.

The pressure sensor 132 outputs pressure data that can be stored in the memory device 114 and/or analyzed by the processor 112 of the control system 110. In some implementations, the pressure sensor 132 is an air pressure sensor (e.g., barometric pressure sensor) that generates sensor data indicative of the respiration (e.g., inhaling and/or exhaling) of the user of the respiratory system 120 and/or ambient pressure. In such implementations, the pressure sensor 132 can be coupled to or integrated in the respiratory device 122. The pressure sensor 132 can be, for example, a capacitive sensor, an electromagnetic sensor, an inductive sensor, a resistive sensor, a piezoelectric sensor, a strain-gauge sensor, an optical sensor, a potentiometric sensor, or any combination thereof. In one example, the pressure sensor 132 can be used to determine a blood pressure of the user.

The flow rate sensor 134 outputs flow rate data that can be stored in the memory device 114 and/or analyzed by the processor 112 of the control system 110. In some implementations, the flow rate sensor 134 is used to determine an air flow rate from the respiratory device 122, an air flow rate through the conduit 126, an air flow rate through the user interface 124, or any combination thereof. In such implementations, the flow rate sensor 134 can be coupled to or integrated in the respiratory device 122, the user interface 124, or the conduit 126. The flow rate sensor 134 can be a mass flow rate sensor such as, for example, a rotary flow meter (e.g., Hall effect flow meters), a turbine flow meter, an orifice flow meter, an ultrasonic flow meter, a hot wire sensor, a vortex sensor, a membrane sensor, or any combination thereof.

The temperature sensor 136 outputs temperature data that can be stored in the memory device 114 and/or analyzed by the processor 112 of the control system 110. In some implementations, the temperature sensor 136 generates temperatures data indicative of a core body temperature of the user 210 (FIG. 2), a skin temperature of the user 210, a temperature of the air flowing from the respiratory device 122 and/or through the conduit 126, a temperature in the user interface 124, an ambient temperature, or any combination thereof. The temperature sensor 136 can be, for example, a thermocouple sensor, a thermistor sensor, a silicon band gap temperature sensor or semiconductor-based sensor, a resistance temperature detector, or any combination thereof.

The motion sensor 138 outputs motion data that can be stored in the memory device 114 and/or analyzed by the processor 112 of the control system 110. The motion sensor 138 can be used to detect movement of the user 210 during the sleep session, and/or detect movement of any of the components of the respiratory system 120, such as the respiratory device 122, the user interface 124, or the conduit 126. The motion sensor 138 can include one or more inertial sensors, such as accelerometers, gyroscopes, and magnetometers. The motion sensor 138 can be used to detect motion or acceleration associated with arterial pulses, such as pulses in or around the face of the user 210 and proximal to the user interface 124, and configured to detect features of the pulse shape, speed, amplitude, or volume.

The microphone 140 outputs sound data that can be stored in the memory device 114 and/or analyzed by the processor 112 of the control system 110. The audio data generated by the microphone 140 is reproducible as one or more sound(s) during a sleep session (e.g., sounds from the user 210) to determine (e.g., using the control system 110) one or more sleep-related parameters, as described in further detail herein. The audio data from the microphone 140 can also be used to identifying (e.g., using the control system 110) an event experienced by the user during the sleep session, as described in further detail herein. The microphone 140 can be coupled to or integrated in the respiratory device 122, the user interface 124, the conduit 126, or the external device 170.

The speaker 142 outputs sound waves that are audible to a user of the system 100 (e.g., the user 210 of FIG. 2). The speaker 142 can be used, for example, as an alarm clock or to play an alert or message to the user 210 (e.g., in response to an event). In some implementations, the speaker 142 can be used to communicate the audio data generated by the microphone 140 to the user. The speaker 142 can be coupled to or integrated in the respiratory device 122, the user interface 124, the conduit 126, or the external device 170.

The microphone 140 and the speaker 142 can be used as separate devices. In some implementations, the microphone 140 and the speaker 142 can be combined into an acoustic sensor 141, as described in, for example, WO 2018/050913, which is hereby incorporated by reference herein in its entirety. In such implementations, the speaker 142 generates or emits sound waves at a predetermined interval and the microphone 140 detects the reflections of the emitted sound waves from the speaker 142. The sound waves generated or emitted by the speaker 142 have a frequency that is not audible to the human ear (e.g., below 20 Hz or above around 18 kHz) so as not to disturb the sleep of the user 210 or the bed partner 220 (FIG. 2). Based at least in part on the data from the microphone 140 and/or the speaker 142, the control system 110 can determine a location of the user 210 (FIG. 2) and/or one or more of the sleep-related parameters described in herein. In some implementations, the speaker 142 is a bone conduction speaker. In some implementations, the one or more sensors 130 include (i) a first microphone that is the same or similar to the microphone 140, and is integrated into the acoustic sensor 141 and (ii) a second microphone that is the same as or similar to the microphone 140, but is separate and distinct from the first microphone that is integrated into the acoustic sensor 141.

The RF transmitter 148 generates and/or emits radio waves having a predetermined frequency and/or a predetermined amplitude (e.g., within a high frequency band, within a low frequency band, long wave signals, short wave signals, etc.). The RF receiver 146 detects the reflections of the radio waves emitted from the RF transmitter 148, and this data can be analyzed by the control system 110 to determine a location of the user 210 (FIG. 2) and/or one or more of the sleep-related parameters described herein. An RF receiver (either the RF receiver 146 and the RF transmitter 148 or another RF pair) can also be used for wireless communication between the control system 110, the respiratory device 122, the one or more sensors 130, the external device 170, or any combination thereof. While the RF receiver 146 and RF transmitter 148 are shown as being separate and distinct elements in FIG. 1, in some implementations, the RF receiver 146 and RF transmitter 148 are combined as a part of a radio-frequency (RF) sensor 147. In some such implementations, the RF sensor 147 includes a control circuit. The specific format of the RF communication could be WiFi, Bluetooth, etc.

In some implementations, the RF sensor 147 is a part of a mesh system. One example of a mesh system is a WiFi mesh system, which can include mesh nodes, mesh router(s), and mesh gateway(s), each of which can be mobile/movable or fixed. In such implementations, the WiFi mesh system includes a WiFi router and/or a WiFi controller and one or more satellites (e.g., access points), each of which include an RF sensor that the is the same as, or similar to, the RF sensor 147. The WiFi router and satellites continuously communicate with one another using WiFi signals. The WiFi mesh system can be used to generate motion data based at least in part on changes in the WiFi signals (e.g., differences in received signal strength) between the router and the satellite(s) due to an object or person moving partially obstructing the signals. The motion data can be indicative of motion, breathing, heart rate, gait, falls, behavior, etc., or any combination thereof.

The camera 150 outputs image data reproducible as one or more images (e.g., still images, video images, thermal images, or a combination thereof) that can be stored in the memory device 114. The image data from the camera 150 can be used by the control system 110 to determine one or more of the sleep-related parameters described herein. For example, the image data from the camera 150 can be used to identify a location of the user, to determine a time when the user 210 enters the bed 230 (FIG. 2), and to determine a time when the user 210 exits the bed 230. The camera 150 can also be used to track eye movements, pupil dilation (if one or both of the user 210's eyes are open), blink rate, or any changes during REM sleep. The camera 150 can also be used to track the position of the user, which can impact the duration and/or severity of apneic episodes in users with positional obstructive sleep apnea.

The IR sensor 152 outputs infrared image data reproducible as one or more infrared images (e.g., still images, video images, or both) that can be stored in the memory device 114. The infrared data from the IR sensor 152 can be used to determine one or more sleep-related parameters during the sleep session, including a temperature of the user 210 and/or movement of the user 210. The IR sensor 152 can also be used in conjunction with the camera 150 when measuring the presence, location, and/or movement of the user 210. The IR sensor 152 can detect infrared light having a wavelength between about 700 nm and about 1 mm, for example, while the camera 150 can detect visible light having a wavelength between about 380 nm and about 740 nm.

The PPG sensor 154 outputs physiological data associated with the user 210 (FIG. 2) that can be used to determine one or more sleep-related parameters, such as, for example, a heart rate, a heart rate pattern, a heart rate variability, a cardiac cycle, respiration rate, an inspiration amplitude, an expiration amplitude, an inspiration-expiration ratio, estimated blood pressure parameter(s), or any combination thereof. The PPG sensor 154 can be worn by the user 210, embedded in clothing and/or fabric that is worn by the user 210, embedded in and/or coupled to the user interface 124 and/or its associated headgear (e.g., straps, etc.), etc.

The ECG sensor 156 outputs physiological data associated with electrical activity of the heart of the user 210. In some implementations, the ECG sensor 156 includes one or more electrodes that are positioned on or around a portion of the user 210 during the sleep session. The physiological data from the ECG sensor 156 can be used, for example, to determine one or more of the sleep-related parameters described herein.

The EEG sensor 158 outputs physiological data associated with electrical activity of the brain of the user 210. In some implementations, the EEG sensor 158 includes one or more electrodes that are positioned on or around the scalp of the user 210 during the sleep session. The physiological data from the EEG sensor 158 can be used, for example, to determine a sleep stage of the user 210 at any given time during the sleep session. In some implementations, the EEG sensor 158 can be integrated in the user interface 124 and/or the associated headgear (e.g., straps, etc.).

The capacitive sensor 160, the force sensor 162, and the strain gauge sensor 164 output data that can be stored in the memory device 114 and used by the control system 110 to determine one or more of the sleep-related parameters described herein. The EMG sensor 166 outputs physiological data associated with electrical activity produced by one or more muscles. The oxygen sensor 168 outputs oxygen data indicative of an oxygen concentration of gas (e.g., in the conduit 126 or at the user interface 124). The oxygen sensor 168 can be, for example, an ultrasonic oxygen sensor, an electrical oxygen sensor, a chemical oxygen sensor, an optical oxygen sensor, or any combination thereof. In some implementations, the one or more sensors 130 also include a galvanic skin response (GSR) sensor, a blood flow sensor, a respiration sensor, a pulse sensor, a sphygmomanometer sensor, an oximetry sensor, or any combination thereof.

The analyte sensor 174 can be used to detect the presence of an analyte in the exhaled breath of the user 210. The data output by the analyte sensor 174 can be stored in the memory device 114 and used by the control system 110 to determine the identity and concentration of any analytes in the user 210's breath. In some implementations, the analyte sensor 174 is positioned near a mouth of the user 210 to detect analytes in breath exhaled from the user 210's mouth. For example, when the user interface 124 is a facial mask that covers the nose and mouth of the user 210, the analyte sensor 174 can be positioned within the facial mask to monitor the user 210's mouth breathing. In other implementations, such as when the user interface 124 is a nasal mask or a nasal pillow mask, the analyte sensor 174 can be positioned near the nose of the user 210 to detect analytes in breath exhaled through the user 210's nose. In still other implementations, the analyte sensor 174 can be positioned near the user 210's mouth when the user interface 124 is a nasal mask or a nasal pillow mask. In this implementation, the analyte sensor 174 can be used to detect whether any air is inadvertently leaking from the user 210's mouth. In some implementations, the analyte sensor 174 is a volatile organic compound (VOC) sensor that can be used to detect carbon-based chemicals or compounds, such as carbon dioxide. In some implementations, the analyte sensor 174 can also be used to detect whether the user 210 is breathing through their nose or mouth. For example, if the data output by an analyte sensor 174 positioned near the mouth of the user 210 or within the facial mask (in implementations where the user interface 124 is a facial mask) detects the presence of an analyte, the control system 110 can use this data as an indication that the user 210 is breathing through their mouth.

The moisture sensor 176 outputs data that can be stored in the memory device 114 and used by the control system 110. The moisture sensor 176 can be used to detect moisture in various areas surrounding the user (e.g., inside the conduit 126 or the user interface 124, near the user 210's face, near the connection between the conduit 126 and the user interface 124, near the connection between the conduit 126 and the respiratory device 122, etc.). Thus, in some implementations, the moisture sensor 176 can be coupled to or integrated into the user interface 124 or in the conduit 126 to monitor the humidity of the pressurized air from the respiratory device 122. In other implementations, the moisture sensor 176 is placed near any area where moisture levels need to be monitored. The moisture sensor 176 can also be used to monitor the humidity of the ambient environment surrounding the user 210, for example the air inside the user 210's bedroom. The moisture sensor 176 can also be used to track the user 210's biometric response to environmental changes.

One or more LiDAR sensors 178 can be used for depth sensing. This type of optical sensor (e.g., laser sensor) can be used to detect objects and build three dimensional (3D) maps of the surroundings, such as of a living space. LiDAR can generally utilize a pulsed laser to make time of flight measurements. LiDAR is also referred to as 3D laser scanning. In an example of use of such a sensor, a fixed or mobile device (such as a smartphone) having a LiDAR sensor 178 can measure and map an area extending 5 meters or more away from the sensor. The LiDAR data can be fused with point cloud data estimated by an electromagnetic RADAR sensor, for example. The LiDAR sensor 178 may also use artificial intelligence (AI) to automatically geofence RADAR systems by detecting and classifying features in a space that might cause issues for RADAR systems, such a glass windows (which can be highly reflective to RADAR). LiDAR can also be used to provide an estimate of the height of a person, as well as changes in height when the person sits down, or falls down, for example. LiDAR may be used to form a 3D mesh representation of an environment. In a further use, for solid surfaces through which radio waves pass (e.g., radio-translucent materials), the LiDAR may reflect off such surfaces, thus allowing a classification of different type of obstacles.

While shown separately in FIG. 1, any combination of the one or more sensors 130 can be integrated in and/or coupled to any one or more of the components of the system 100, including the respiratory device 122, the user interface 124, the conduit 126, the humidification tank 129, the control system 110, the external device 170, or any combination thereof. For example, the acoustic sensor 141 and/or the RF sensor 147 can be integrated in and/or coupled to the external device 170. In such implementations, the external device 170 can be considered a secondary device that generates additional or secondary data for use by the system 100 (e.g., the control system 110) according to some aspects of the present disclosure. In some implementations, the pressure sensor 132 and/or the flow rate sensor 134 are integrated into and/or coupled to the respiratory device 122. In some implementations, at least one of the one or more sensors 130 is not coupled to the respiratory device 122, the control system 110, or the external device 170, and is positioned generally adjacent to the user 210 during the sleep session (e.g., positioned on or in contact with a portion of the user 210, worn by the user 210, coupled to or positioned on the nightstand, coupled to the mattress, coupled to the ceiling, etc.). More generally, the one or more sensors 130 can be positioned at any suitable location relative to the user 210 such that the one or more sensors 130 can generate physiological data associated with the user 210 and/or the bed partner 220 during one or more sleep session.

The data from the one or more sensors 130 can be analyzed to determine one or more sleep-related parameters, which can include a respiration signal, a respiration rate, a respiration pattern, an inspiration amplitude, an expiration amplitude, an inspiration-expiration ratio, an occurrence of one or more events, a number of events per hour, a pattern of events, an average duration of events, a range of event durations, a ratio between the number of different events, a sleep stage, an apnea-hypopnea index (AHI), or any combination thereof. The one or more events can include snoring, apneas, central apneas, obstructive apneas, mixed apneas, hypopneas, an intentional user interface leak, an unintentional user interface leak, a mouth leak, a cough, a restless leg, a sleeping disorder, choking, an increased heart rate, labored breathing, an asthma attack, an epileptic episode, a seizure, increased blood pressure, or any combination thereof. Many of these sleep-related parameters are physiological parameters, although some of the sleep-related parameters can be considered to be non-physiological parameters. Other types of physiological and non-physiological parameters can also be determined, either from the data from the one or more sensors 130, or from other types of data.

The external device 170 (FIG. 1) includes a display device 172. The external device 170 can be, for example, a mobile device such as a smart phone, a tablet, a laptop, or the like. Alternatively, the external device 170 can be an external sensing system, a television (e.g., a smart television) or another smart home device (e.g., a smart speaker(s) such as Google Home, Amazon Echo, Alexa etc.). In some implementations, the user device is a wearable device (e.g., a smart watch). The display device 172 is generally used to display image(s) including still images, video images, or both. In some implementations, the display device 172 acts as a human-machine interface (HMI) that includes a graphic user interface (GUI) configured to display the image(s) and an input interface. The display device 172 can be an LED display, an OLED display, an LCD display, or the like. The input interface can be, for example, a touchscreen or touch-sensitive substrate, a mouse, a keyboard, or any sensor system configured to sense inputs made by a human user interacting with the external device 170. In some implementations, one or more user devices can be used by and/or included in the system 100.

The blood pressure device 180 is generally used to aid in generating physiological data for determining one or more blood pressure measurements associated with a user. The blood pressure device 180 can include at least one of the one or more sensors 130 to measure, for example, a systolic blood pressure component and/or a diastolic blood pressure component.

In some implementations, the blood pressure device 180 is a sphygmomanometer including an inflatable cuff that can be worn by a user and a pressure sensor (e.g., the pressure sensor 132 described herein). For example, as shown in the example of FIG. 2, the blood pressure device 180 can be worn on an upper arm of the user 210. In such implementations where the blood pressure device 180 is a sphygmomanometer, the blood pressure device 180 also includes a pump (e.g., a manually operated bulb) for inflating the cuff. In some implementations, the blood pressure device 180 is coupled to the respiratory device 122 of the respiratory system 120, which in turn delivers pressurized air to inflate the cuff. More generally, the blood pressure device 180 can be communicatively coupled with, and/or physically integrated in (e.g., within a housing), the control system 110, the memory device 114, the respiratory system 120, the external device 170, and/or the activity tracker 190.

The activity tracker 190 is generally used to aid in generating physiological data for determining an activity measurement associated with the user. The activity measurement can include, for example, a number of steps, a distance traveled, a number of steps climbed, a duration of physical activity, a type of physical activity, an intensity of physical activity, time spent standing, a respiration rate, an average respiration rate, a resting respiration rate, a maximum respiration rate, a respiration rate variability, a heart rate, an average heart rate, a resting heart rate, a maximum heart rate, a heart rate variability, a number of calories burned, blood oxygen saturation, electrodermal activity (also known as skin conductance or galvanic skin response), or any combination thereof. The activity tracker 190 includes one or more of the sensors 130 described herein, such as, for example, the motion sensor 138 (e.g., one or more accelerometers and/or gyroscopes), the PPG sensor 154, and/or the ECG sensor 156.

In some implementations, the activity tracker 190 is a wearable device that can be worn by the user, such as a smartwatch, a wristband, a ring, or a patch. For example, referring to FIG. 2, the activity tracker 190 is worn on a wrist of the user 210. The activity tracker 190 can also be coupled to or integrated a garment or clothing that is worn by the user. Alternatively, still, the activity tracker 190 can also be coupled to or integrated in (e.g., within the same housing) the external device 170. More generally, the activity tracker 190 can be communicatively coupled with, or physically integrated in (e.g., within a housing), the control system 110, the memory device 114, the respiratory system 120, the external device 170, and/or the blood pressure device 180.

While the control system 110 and the memory device 114 are described and shown in FIG. 1 as being a separate and distinct component of the system 100, in some implementations, the control system 110 and/or the memory device 114 are integrated in the external device 170 and/or the respiratory device 122. Alternatively, in some implementations, the control system 110 or a portion thereof (e.g., the processor 112) can be located in a cloud (e.g., integrated in a server, integrated in an Internet of Things (IoT) device, connected to the cloud, be subject to edge cloud processing, etc.), located in one or more servers (e.g., remote servers, local servers, etc., or any combination thereof.

While system 100 is shown as including all of the components described above, more or fewer components can be included in a system for canceling noises during use of the respiratory system 120, according to implementations of the present disclosure. For example, a first alternative system includes the control system 110, the memory device 114, and at least one of the one or more sensors 130. As another example, a second alternative system includes the control system 110, the memory device 114, at least one of the one or more sensors 130, and the external device 170. As yet another example, a third alternative system includes the control system 110, the memory device 114, the respiratory system 120, at least one of the one or more sensors 130, and the external device 170. As a further example, a fourth alternative system includes the control system 110, the memory device 114, the respiratory system 120, at least one of the one or more sensors 130, the external device 170, and the blood pressure device 180 and/or activity tracker 190. In further examples, the microphone 140 included in the one or more sensors 130 can include the microphone 242, the feedback microphone 243, or both. In even further examples, the speaker 142 included in the one or more sensors 130 can include the speaker 244. Thus, various systems for analyzing data associated with a user's use of the respiratory system 120 can be formed using any portion or portions of the components shown and described herein and/or in combination with one or more other components.

As used herein, a sleep session can be defined in a number of ways based at least in part on, for example, an initial start time and an end time. In some implementations, a sleep session is a duration where the user is asleep, that is, the sleep session has a start time and an end time, and during the sleep session, the user does not wake until the end time. That is, any period of the user being awake is not included in a sleep session. From this first definition of sleep session, if the user wakes ups and falls asleep multiple times in the same night, each of the sleep intervals separated by an awake interval is a sleep session.

Alternatively, in some implementations, a sleep session has a start time and an end time, and during the sleep session, the user can wake up, without the sleep session ending, so long as a continuous duration that the user is awake is below an awake duration threshold. The awake duration threshold can be defined as a percentage of a sleep session. The awake duration threshold can be, for example, about twenty percent of the sleep session, about fifteen percent of the sleep session duration, about ten percent of the sleep session duration, about five percent of the sleep session duration, about two percent of the sleep session duration, etc., or any other threshold percentage. In some implementations, the awake duration threshold is defined as a fixed amount of time, such as, for example, about one hour, about thirty minutes, about fifteen minutes, about ten minutes, about five minutes, about two minutes, etc., or any other amount of time.

In some implementations, a sleep session is defined as the entire time between the time in the evening at which the user first entered the bed, and the time the next morning when user last left the bed. Put another way, a sleep session can be defined as a period of time that begins on a first date (e.g., Monday, Jan. 6, 2020) at a first time (e.g., 10:00 PM), that can be referred to as the current evening, when the user first enters a bed with the intention of going to sleep (e.g., not if the user intends to first watch television or play with a smart phone before going to sleep, etc.), and ends on a second date (e.g., Tuesday, Jan. 7, 2020) at a second time (e.g., 7:00 AM), that can be referred to as the next morning, when the user first exits the bed with the intention of not going back to sleep that next morning.

In some implementations, the user can manually define the beginning of a sleep session and/or manually terminate a sleep session. For example, the user can select (e.g., by clicking or tapping) one or more user-selectable element that is displayed on the display device 172 of the external device 170 (FIG. 1) to manually initiate or terminate the sleep session.

Figure 3:
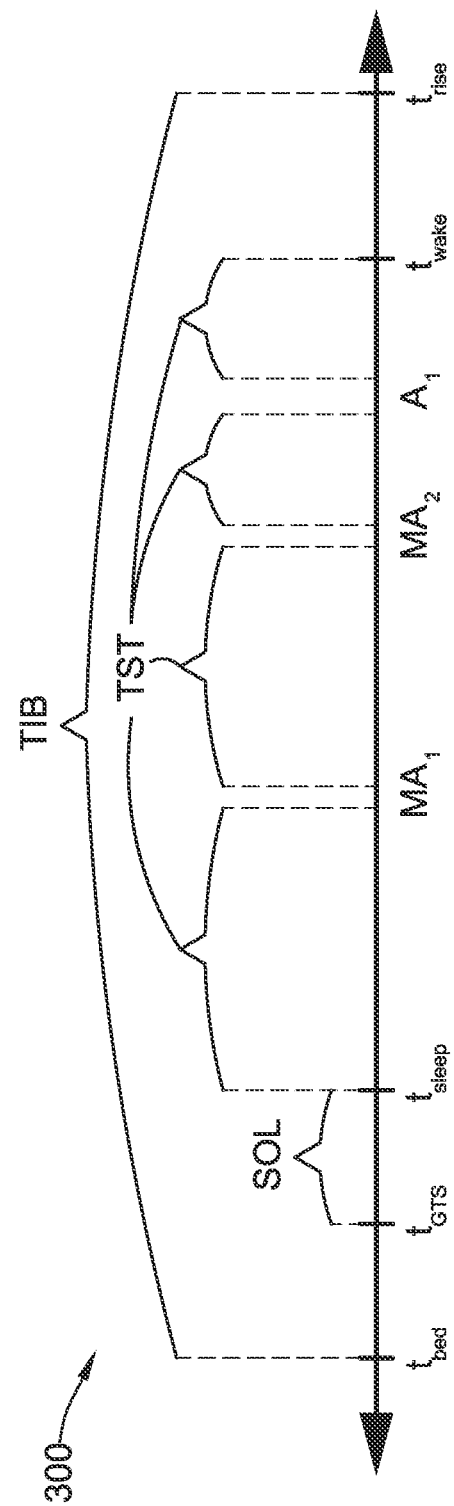
FIG. 3 illustrates an exemplary timeline for a sleep session, according to some implementations of the present disclosure.

Referring to FIG. 3, an exemplary timeline 300 for a sleep session is illustrated. The timeline 300 includes an enter bed time ($t_{bed}$), a go-to-sleep time ($t_{GTS}$), an initial sleep time ($t_{sleep}$), a first micro-awakening $MA_1$, a second micro-awakening $MA_2$, an awakening A, a wake-up time ($t_{wake}$), and a rising time ($t_{rise}$).

The enter bed time $t_{bed}$ is associated with the time that the user initially enters the bed (e.g., bed 230 in FIG. 2) prior to falling asleep (e.g., when the user lies down or sits in the bed). The enter bed time $t_{bed}$ can be identified based at least in part on a bed threshold duration to distinguish between times when the user enters the bed for sleep and when the user enters the bed for other reasons (e.g., to watch TV). For example, the bed threshold duration can be at least about 10 minutes, at least about 20 minutes, at least about 30 minutes, at least about 45 minutes, at least about 1 hour, at least about 2 hours, etc. While the enter bed time $t_{bed}$ is described herein in reference to a bed, more generally, the enter time $t_{bed}$ can refer to the time the user initially enters any location for sleeping (e.g., a couch, a chair, a sleeping bag, etc.).

The go-to-sleep time (GTS) is associated with the time that the user initially attempts to fall asleep after entering the bed ($t_{bed}$). For example, after entering the bed, the user may engage in one or more activities to wind down prior to trying to sleep (e.g., reading, watching TV, listening to music, using the external device 170, etc.). The initial sleep time ($t_{sleep}$) is the time that the user initially falls asleep. For example, the initial sleep time ($t_{sleep}$) can be the time that the user initially enters the first non-REM sleep stage.

The wake-up time $t_{wake}$ is the time associated with the time when the user wakes up without going back to sleep (e.g., as opposed to the user waking up in the middle of the night and going back to sleep). The user may experience one of more unconscious microawakenings (e.g., microawakenings $MA_1$ and $MA_2$) having a short duration (e.g., 5 seconds, 10 seconds, 30 seconds, 1 minute, etc.) after initially falling asleep. In contrast to the wake-up time $t_{wake}$, the user goes back to sleep after each of the microawakenings $MA_1$ and $MA_2$. Similarly, the user may have one or more conscious awakenings (e.g., awakening A) after initially falling asleep (e.g., getting up to go to the bathroom, attending to children or pets, sleep walking, etc.). However, the user goes back to sleep after the awakening A. Thus, the wake-up time $t_{wake}$ can be defined, for example, based at least in part on a wake threshold duration (e.g., the user is awake for at least 15 minutes, at least 20 minutes, at least 30 minutes, at least 1 hour, etc.).

Similarly, the rising time $t_{rise}$ is associated with the time when the user exits the bed and stays out of the bed with the intent to end the sleep session (e.g., as opposed to the user getting up during the night to go to the bathroom, to attend to children or pets, sleep walking, etc.). In other words, the rising time $t_{rise}$ is the time when the user last leaves the bed without returning to the bed until a next sleep session (e.g., the following evening). Thus, the rising time $t_{rise}$ can be defined, for example, based at least in part on a rise threshold duration (e.g., the user has left the bed for at least 15 minutes, at least 20 minutes, at least 30 minutes, at least 1 hour, etc.). The enter bed time $t_{bed}$ time for a second, subsequent sleep session can also be defined based at least in part on a rise threshold duration (e.g., the user has left the bed for at least 4 hours, at least 6 hours, at least 8 hours, at least 12 hours, etc.).

As described above, the user may wake up and get out of bed one more times during the night between the initial $t_{bed}$ and the final $t_{rise}$. In some implementations, the final wake-up time $t_{wake}$ and/or the final rising time $t_{rise}$ that are identified or determined based at least in part on a predetermined threshold duration of time subsequent to an event (e.g., falling asleep or leaving the bed). Such a threshold duration can be customized for the user. For a standard user which goes to bed in the evening, then wakes up and goes out of bed in the morning any period (between the user waking up ($t_{wake}$) or raising up ($t_{rise}$), and the user either going to bed ($t_{bed}$), going to sleep ($t_{GTS}$) or falling asleep ($t_{sleep}$) of between about 12 and about 18 hours can be used. For users that spend longer periods of time in bed, shorter threshold periods may be used (e.g., between about 8 hours and about 14 hours). The threshold period may be initially selected and/or later adjusted based at least in part on the system monitoring the user's sleep behavior.

The total time in bed (TIB) is the duration of time between the time enter bed time $t_{bed}$ and the rising time $t_{rise}$. The total sleep time (TST) is associated with the duration between the initial sleep time and the wake-up time, excluding any conscious or unconscious awakenings and/or micro-awakenings therebetween. Generally, the total sleep time (TST) will be shorter than the total time in bed (TIB) (e.g., one minute short, ten minutes shorter, one hour shorter, etc.). For example, referring to the timeline 300 of FIG. 3, the total sleep time (TST) spans between the initial sleep time $t_{sleep}$ and the wake-up time $t_{wake}$, but excludes the duration of the first micro-awakening $MA_1$, the second micro-awakening $MA_2$, and the awakening A. As shown, in this example, the total sleep time (TST) is shorter than the total time in bed (TIB).

In some implementations, the total sleep time (TST) can be defined as a persistent total sleep time (PTST). In such implementations, the persistent total sleep time excludes a predetermined initial portion or period of the first non-REM stage (e.g., light sleep stage). For example, the predetermined initial portion can be between about 30 seconds and about 20 minutes, between about 1 minute and about 10 minutes, between about 3 minutes and about 5 minutes, etc. The persistent total sleep time is a measure of sustained sleep, and smooths the sleep-wake hypnogram. For example, when the user is initially falling asleep, the user may be in the first non-REM stage for a very short time (e.g., about 30 seconds), then back into the wakefulness stage for a short period (e.g., one minute), and then goes back to the first non-REM stage. In this example, the persistent total sleep time excludes the first instance (e.g., about 30 seconds) of the first non-REM stage.

In some implementations, the sleep session is defined as starting at the enter bed time ($t_{bed}$) and ending at the rising time ($t_{rise}$), i.e., the sleep session is defined as the total time in bed (TIB). In some implementations, a sleep session is defined as starting at the initial sleep time ($t_{sleep}$) and ending at the wake-up time ($t_{wake}$). In some implementations, the sleep session is defined as the total sleep time (TST). In some implementations, a sleep session is defined as starting at the go-to-sleep time ($t_{GTS}$) and ending at the wake-up time ($t_{wake}$). In some implementations, a sleep session is defined as starting at the go-to-sleep time ($t_{GTS}$) and ending at the rising time ($t_{rise}$). In some implementations, a sleep session is defined as starting at the enter bed time ($t_{bed}$) and ending at the wake-up time ($t_{wake}$). In some implementations, a sleep session is defined as starting at the initial sleep time ($t_{sleep}$) and ending at the rising time ($t_{rise}$).

Figure 4:
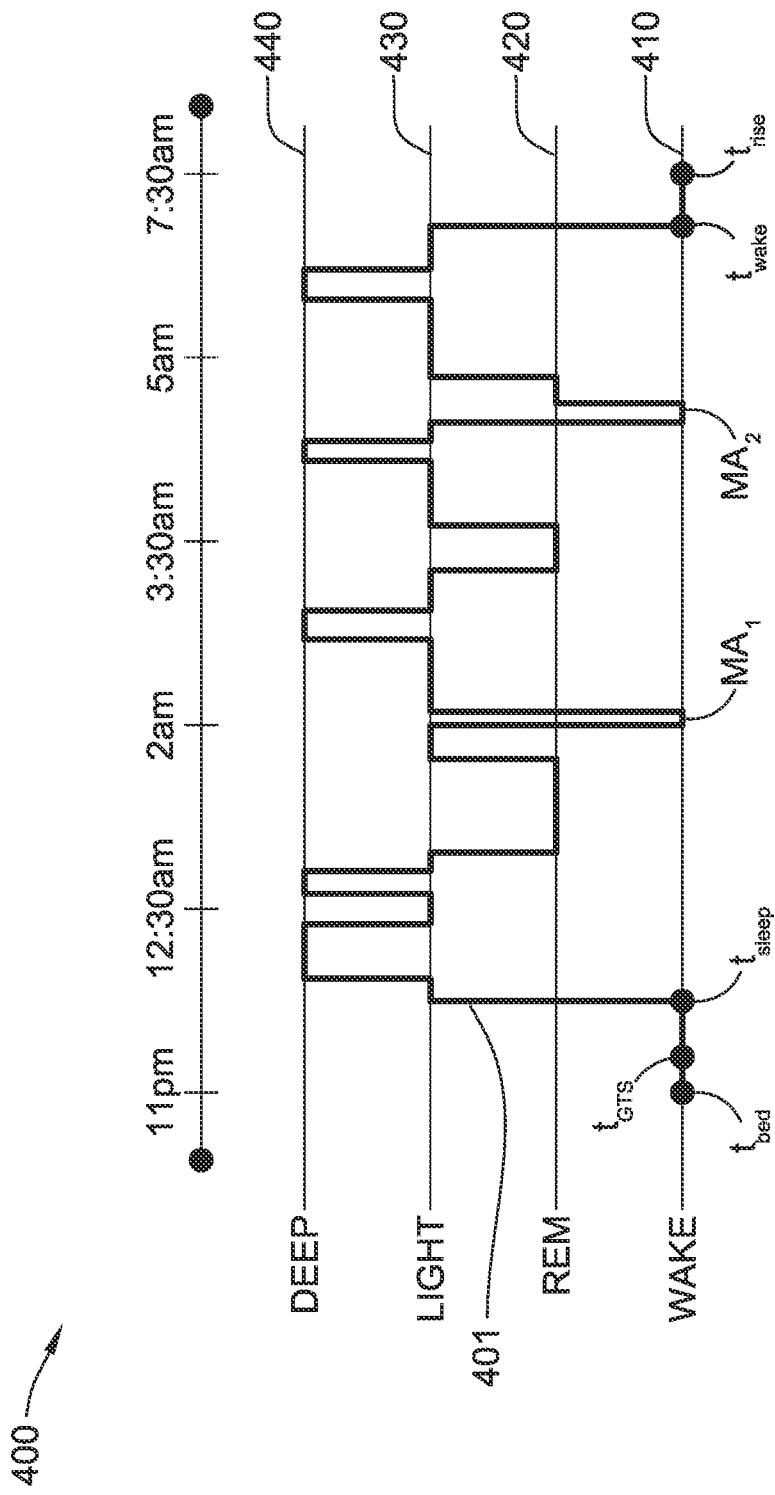
FIG. 4 illustrates an exemplary hypnogram associated with the sleep session of FIG. 3, according to some implementations of the present disclosure.

Referring to FIG. 4, an exemplary hypnogram 400 corresponding to the timeline 300 (FIG. 3), according to some implementations, is illustrated. As shown, the hypnogram 400 includes a sleep-wake signal 401, a wakefulness stage axis 410, a REM stage axis 420, a light sleep stage axis 430, and a deep sleep stage axis 440. The intersection between the sleep-wake signal 401 and one of the axes 410-440 is indicative of the sleep stage at any given time during the sleep session.

The sleep-wake signal 401 can be generated based at least in part on physiological data associated with the user (e.g., generated by one or more of the sensors 130 described herein). The sleep-wake signal can be indicative of one or more sleep stages, including wakefulness, relaxed wakefulness, microawakenings, a REM stage, a first non-REM stage, a second non-REM stage, a third non-REM stage, or any combination thereof. In some implementations, one or more of the first non-REM stage, the second non-REM stage, and the third non-REM stage can be grouped together and categorized as a light sleep stage or a deep sleep stage. For example, the light sleep stage can include the first non-REM stage and the deep sleep stage can include the second non-REM stage and the third non-REM stage. While the hypnogram 400 is shown in FIG. 4 as including the light sleep stage axis 430 and the deep sleep stage axis 440, in some implementations, the hypnogram 400 can include an axis for each of the first non-REM stage, the second non-REM stage, and the third non-REM stage. In other implementations, the sleep-wake signal can also be indicative of a respiration signal, a respiration rate, an inspiration amplitude, an expiration amplitude, an inspiration-expiration amplitude ratio, an inspiration-expiration duration ratio, a number of events per hour, a pattern of events, or any combination thereof. Information describing the sleep-wake signal can be stored in the memory device 114.

The hypnogram 400 can be used to determine one or more sleep-related parameters, such as, for example, a sleep onset latency (SOL), wake-after-sleep onset (WASO), a sleep efficiency (SE), a sleep fragmentation index, sleep blocks, or any combination thereof.

The sleep onset latency (SOL) is defined as the time between the go-to-sleep time ($t_{GTS}$) and the initial sleep time ($t_{sleep}$). In other words, the sleep onset latency is indicative of the time that it took the user to actually fall asleep after initially attempting to fall asleep. In some implementations, the sleep onset latency is defined as a persistent sleep onset latency (PSOL). The persistent sleep onset latency differs from the sleep onset latency in that the persistent sleep onset latency is defined as the duration time between the go-to-sleep time and a predetermined amount of sustained sleep. In some implementations, the predetermined amount of sustained sleep can include, for example, at least 10 minutes of sleep within the second non-REM stage, the third non-REM stage, and/or the REM stage with no more than 2 minutes of wakefulness, the first non-REM stage, and/or movement therebetween. In other words, the persistent sleep onset latency requires up to, for example, 8 minutes of sustained sleep within the second non-REM stage, the third non-REM stage, and/or the REM stage. In other implementations, the predetermined amount of sustained sleep can include at least 10 minutes of sleep within the first non-REM stage, the second non-REM stage, the third non-REM stage, and/or the REM stage subsequent to the initial sleep time. In such implementations, the predetermined amount of sustained sleep can exclude any micro-awakenings (e.g., a ten second micro-awakening does not restart the 10-minute period).

The wake-after-sleep onset (WASO) is associated with the total duration of time that the user is awake between the initial sleep time and the wake-up time. Thus, the wake-after-sleep onset includes short and micro-awakenings during the sleep session (e.g., the micro-awakenings $MA_1$ and $MA_2$ shown in FIG. 4), whether conscious or unconscious.

In some implementations, the wake-after-sleep onset (WASO) is defined as a persistent wake-after-sleep onset (PWASO) that only includes the total durations of awakenings having a predetermined length (e.g., greater than 10 seconds, greater than 30 seconds, greater than 60 seconds, greater than about 5 minutes, greater than about 10 minutes, etc.)

The sleep efficiency (SE) is determined as a ratio of the total time in bed (TIB) and the total sleep time (TST). For example, if the total time in bed is 8 hours and the total sleep time is 7.5 hours, the sleep efficiency for that sleep session is 93.75%. The sleep efficiency is indicative of the sleep hygiene of the user. For example, if the user enters the bed and spends time engaged in other activities (e.g., watching TV) before sleep, the sleep efficiency will be reduced (e.g., the user is penalized). In some implementations, the sleep efficiency (SE) can be calculated based at least in part on the total time in bed (TIB) and the total time that the user is attempting to sleep. In such implementations, the total time that the user is attempting to sleep is defined as the duration between the go-to-sleep (GTS) time and the rising time described herein. For example, if the total sleep time is 8 hours (e.g., between 11 PM and 7 AM), the go-to-sleep time is 10:45 PM, and the rising time is 7:15 AM, in such implementations, the sleep efficiency parameter is calculated as about 94%.

The fragmentation index is determined based at least in part on the number of awakenings during the sleep session. For example, if the user had two micro-awakenings (e.g., micro-awakening $MA_1$ and micro-awakening $MA_2$ shown in FIG. 4), the fragmentation index can be expressed as 2. In some implementations, the fragmentation index is scaled between a predetermined range of integers (e.g., between 0 and 10).

The sleep blocks are associated with a transition between any stage of sleep (e.g., the first non-REM stage, the second non-REM stage, the third non-REM stage, and/or the REM) and the wakefulness stage. The sleep blocks can be calculated at a resolution of, for example, 30 seconds.

In some implementations, the systems and methods described herein can include generating or analyzing a hypnogram including a sleep-wake signal to determine or identify the enter bed time ($t_{bed}$), the go-to-sleep time ($t_{GTS}$), the initial sleep time ($t_{sleep}$), one or more first micro-awakenings (e.g., $MA_1$ and $MA_2$), the wake-up time ($t_{wake}$), the rising time ($t_{rise}$), or any combination thereof based at least in part on the sleep-wake signal of a hypnogram.

In other implementations, one or more of the sensors 130 can be used to determine or identify the enter bed time ($t_{bed}$), the go-to-sleep time ($t_{GTS}$), the initial sleep time ($t_{sleep}$), one or more first micro-awakenings (e.g., $MA_1$ and $MA_2$), the wake-up time ($t_{wake}$), the rising time ($t_{rise}$), or any combination thereof, which in turn define the sleep session. For example, the enter bed time $t_{bed}$ can be determined based at least in part on, for example, data generated by the motion sensor 138, the microphone 140, the camera 150, or any combination thereof. The go-to-sleep time can be determined based at least in part on, for example, data from the motion sensor 138 (e.g., data indicative of no movement by the user), data from the camera 150 (e.g., data indicative of no movement by the user and/or that the user has turned off the lights), data from the microphone 140 (e.g., data indicative of the using turning off a TV), data from the external device 170 (e.g., data indicative of the user no longer using the external device 170), data from the pressure sensor 132 and/or the flow rate sensor 134 (e.g., data indicative of the user turning on the respiratory device 122, data indicative of the user donning the user interface 124, etc.), or any combination thereof.

Continuous positive airway pressure (CPAP) systems are often used to treat individuals suffering from sleep-related respiratory disorders. Generally, the user of a CPAP system wears a user interface (such as a mask), which delivers pressurized air from a respiratory device into the throat of the user to aid in preventing the airway from narrowing and/or collapsing during sleep, thereby increasing the user's oxygen intake. Many CPAP systems generate audible noise during use that can interfere with or interrupt the user's sleep. This noise often arises from the operation of a motor within the respiratory device that generates the pressurized air. Further, noise can arise from air leaks in CPAP systems (e.g., from a mask of the CPAP system). Detecting and canceling such noises during operation of the CPAP system is useful in aiding users and their bed partners to have high quality sleep that is not interrupted by such noises.

FIG. 5A shows a perspective view of the respiratory device 122. The respiratory device 122 includes a housing 260, an air inlet 262, an air outlet 270, and the humidification tank 129. The air inlet 262 includes an inlet cover 264 moveable between a closed position (FIG. 5A) and an open position (FIG. 5B). The inlet cover 264 includes one or more air inlet apertures 265 defined therein. The respiratory device 122 includes a blower motor 267 (shown in FIG. 6A) configured to draw air in through the one or more air inlet apertures 265 defined in the inlet cover 264. The motor is further configured to cause this air to flow through the humidification tank 129 and out of the air outlet 270. The conduit 126 can be fluidly coupled to the air outlet 270, such that the air flows from the air outlet 270 and into the conduit 126. The air outlet 270 includes a seal 277 to ensure that substantially all of the air that exits through the air outlet 270 flows into the conduit 126.

FIG. 5B shows a zoomed-in perspective view of the air inlet 262 when the inlet cover 264 is in the open position. As can be seen in FIG. 5B, a motor inlet 268A of the blower motor 267 (see FIG. 6A) extends through the housing 260 from the inside of the respiratory device 122. The motor inlet 268A terminates shortly past the housing 260 in an open space defined between the housing 260 and the inlet cover 264. The air inlet 262 further includes an air filter 266 positioned between the housing 260 and the inlet cover 264 during use of the respiratory device 122. When the inlet cover 264 is in the closed position (see FIG. 5A), the air filter 266 is positioned between the air inlet apertures 265 and the motor inlet 268A. The air filter 266 filters the air that flows through the air inlet apertures 265 and into the motor inlet 268A. Together, the inlet cover 264 and the air filter 266 prevent unwanted objects and debris from being drawn into the motor inlet 268A.

As can be seen in FIG. 5B, the microphone 242 is disposed in the air inlet 262 of the respiratory device 122. In the implementation illustrated in FIG. 5B, the microphone 242 is disposed in the motor inlet 268A. However, in other implementations, the microphone 242 can be disposed in other locations, such as in the open space between the housing 260 and the inlet cover 264 (e.g., outside of the motor inlet 268A), or on the outside of the inlet cover 264 itself. As will be explained in more detail, the microphone 242 is configured to generate sound data representative of sound that is generated by the respiratory device 122 during use.

Figure 6A:
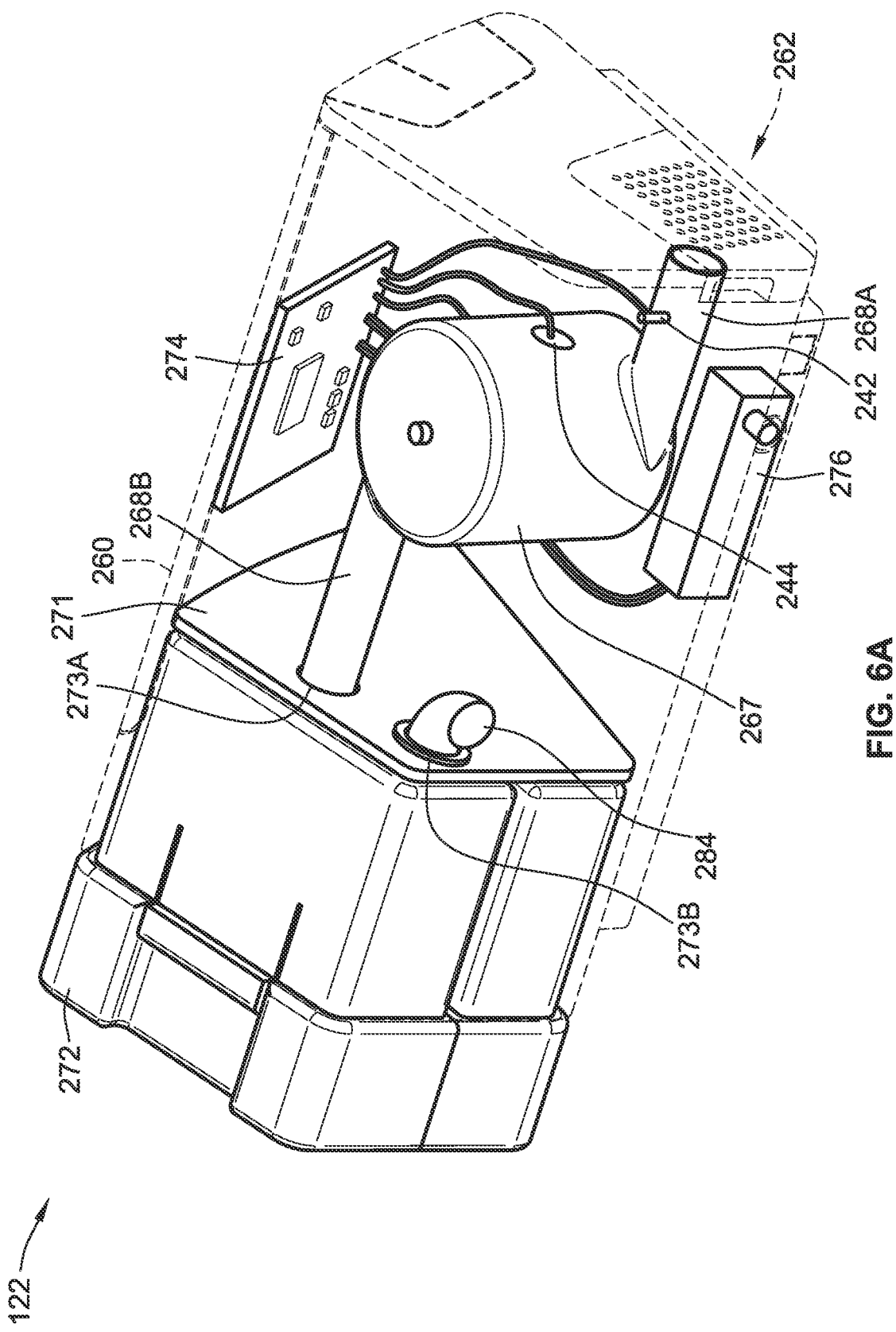
FIG. 6A is a partially transparent rear perspective view of the respiratory device of FIG. 5A including a blower motor therein, according to some implementations of the present disclosure.

FIG. 6A shows a partially transparent perspective view of the respiratory device 122. The blower motor 267 is disposed inside the housing 260 of the respiratory device 122. The speaker 244 is coupled to the exterior of the blower motor 267 and is in fluid communication with an inner chamber of the motor (see FIG. 7A). While the speaker 244 is shown as being in direct fluid communication with the blower motor 267, it is contemplated that in some implementations, the speaker 244 is in fluid communication with any portion (e.g., a chamber, a tube, etc.) of a pneumatic system that includes the blower motor 267. In some such implementations, in addition to the blower motor 267, the pneumatic system also includes a motor inlet 268A, a motor outlet 268B, a portion of the humidification tank 129, a humidification outlet 284, or any combination thereof. That is, in some implementations, the speaker 244 is directly coupled to any portion of the pneumatic system such that sound emitted by the speaker 244 is in fluid communication with the internal path of the pneumatic system.

The microphone 242 and the speaker 244 are both electrically connected to a control board 274. In some implementations, the control board 274 contains the processor 112, and thus forms the control system 110. In other implementations, the control system 110 is separate from the control board 274. In these implementations, the control board 274 includes a separate processor and a communication interface to allow the control board 274 to communicate with the control system 110. The respiratory device 122 further includes a power converter 276 electrically connected to the control board 274. The power converter 276 includes a receptacle that opens to the exterior of the respiratory device 122 that allows the respiratory device 122 to be connected to an external power source, such as an electrical outlet via an external electrical cable. The power converter 276 powers the blower motor 267, the microphone 242, the speaker 244, the control board 274, and any other electronic components of the respiratory device 122.

The blower motor 267 includes the motor inlet 268A that extends through the housing 260 to the air inlet 262. The blower motor 267 further includes a motor outlet 268B that extends towards an aperture 273A defined in a wall 271 of the housing 260. The motor outlet 268B terminates at the aperture 273A or slightly past the aperture 273A, and thus opens to the opposite side of the wall 271 from the blower motor 267. When the respiratory device 122 is in use, the blower motor 267 causes air to flow into the motor inlet 268A, through an inner chamber (see FIG. 7A) of the motor, and out of the motor outlet 268B through the aperture 273A. A seal 275A (see FIG. 6B) is disposed about the periphery of the aperture 273A to ensure that substantially all of the air that exits the motor outlet 268B passes through the aperture 273A. Thus, the inner chamber of the blower motor 267 is in fluid communication with the opposite side of the interior wall 271.

Figure 6B:
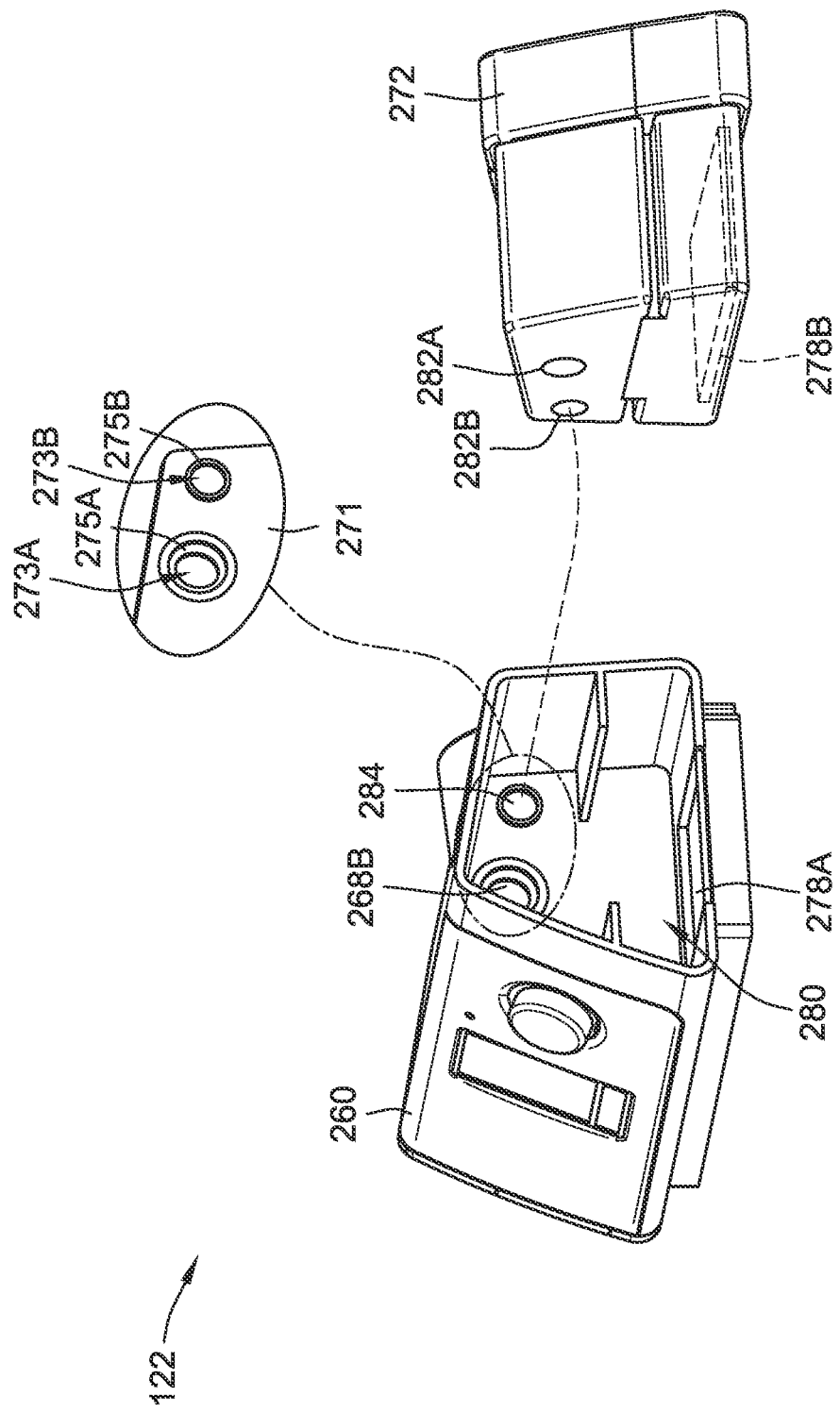
FIG. 6B is a partially exploded front perspective view of the respiratory device of FIG. 5A with a humidification tank removed therefrom, according to some implementations of the present disclosure.

FIG. 6B illustrates an exploded perspective view of the respiratory device 122. The housing 260 forms a humidification tank cavity 280 into which the humidification tank 129 can be placed during operation of the respiratory system 120. As shown, the humidification tank 129 includes two apertures 282A and 282B. When the humidification tank 129 is placed into the humidification tank cavity 280, the apertures 282A and 282B abut the opposite side of the wall 271. Aperture 282A of the humidification tank 129 is aligned with aperture 273A in the wall 271, such that air flowing out of the motor outlet 268B flows into the interior of the humidification tank 129. The seal 275A prevents any of the water from leaving the humidification tank 129 through the aperture 282A, and ensures that substantially all of the air that flows through the aperture 273A in the wall 271 flows into the interior of the humidification tank 129.

The respiratory device 122 includes a heating plate 278A positioned inside the humidification tank cavity 280. The humidification tank 129 includes a corresponding heating plate 278B, which can be located inside the humidification tank 129 or on an underside of the humidification tank 129. When the humidification tank 129 is inserted into the humidification tank cavity 280, the heating plate 278B is aligned with the heating plate 278A. The heating plate 278A is connected to a power source that heats the heating plate 278A. In turn, the heating plate 278A heats the heating plate 278B. When the humidification tank 129 is filled with water, heating the heating plate 278B causes the water to evaporate, thereby humidifying the air that flows into the humidification tank 129 from the blower motor 267.

The wall 271 contains a second aperture 273B that is aligned with the aperture 282B of the humidification tank 129, when the humidification tank 129 is positioned in the humidification tank cavity 280. A seal 275B is be disposed about the periphery of the aperture 273B on both sides of the wall 271. The seal 275B ensures that no water or air from the humidification tank 129 can leak out of the humidification tank 129 into the humidification tank cavity 280.

Referring back to FIG. 6A, the respiratory device 122 includes a humidification outlet 284 (also shown in FIGS. 3A and 4B) that extends toward the aperture 273B in the wall 271, on the opposite side of the wall 271 from the humidification tank 129. The blower motor 267 causes air to enter the humidification tank 129 through aperture 273A in the wall 271, and exit the humidification tank 129 through aperture 273B in the wall 271. The evaporated water in the humidification tank 129 humidifies the air that travels through the humidification tank 129, and this humidified air travels through the humidification outlet 284. The seal 275B ensures that substantially all of the humidified air that exits the humidification tank 129 through the aperture 273A passes into the humidification outlet 284. The humidification outlet 284 extends through an aperture in the housing 260 to form the air outlet 270 of the respiratory device 122. The conduit 126 can be coupled to the air outlet 270 to carry the humidified air as it leaves the respiratory device 122. The seal 277 (see FIG. 5A) located at the air outlet 270 ensures that substantially all of the humidified air that passes into the humidification outlet 284 moves into the conduit 126 when the conduit 126 is coupled to the air outlet 270.

Figure 7A:
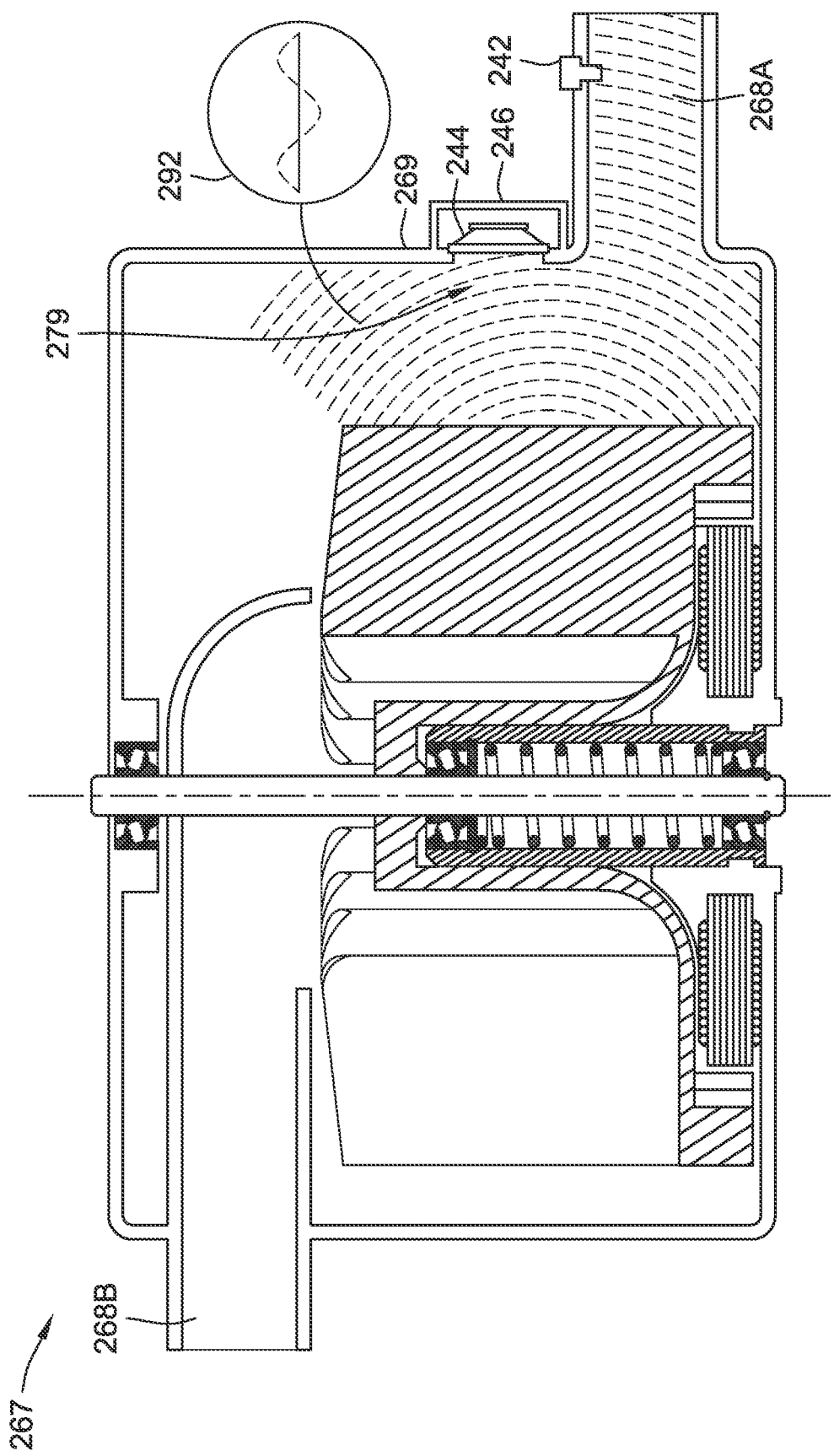
FIG. 7A is a cross-sectional view of the blower motor of the respiratory device of FIG. 5A illustrating noise being generated by the blower motor, according to some implementations of the present disclosure.
Figure 7B:
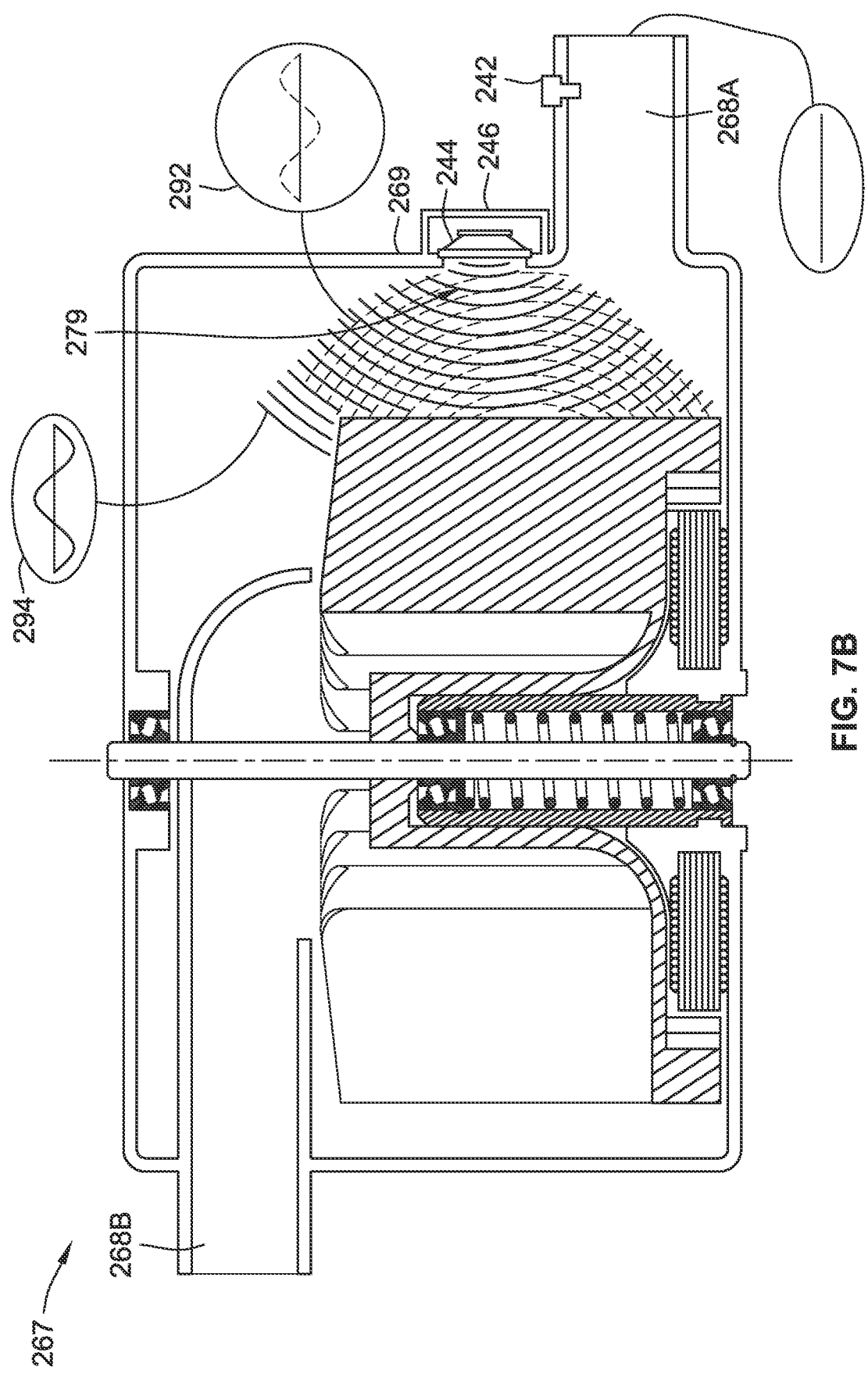
FIG. 7B is a cross-sectional view of the blower motor of FIG. 7A showing the noise generated by the blower motor being cancelled by cancellation sound being emitted by a speaker, according to some implementations of the present disclosure.

FIGS. 5A and 5B show cross-sections of the blower motor 267. FIG. 7A shows the blower motor 267 when the microphone 242 and the speaker 244 are not active, and are not canceling the noise from the blower motor 267. FIG. 7B shows the blower motor 267 when the microphone 242 and the speaker 244 are active, and are canceling the noise from the blower motor 267. As is illustrated, the microphone 242 is generally disposed in the motor inlet 268A. The speaker 244 is generally positioned within a speaker enclosure 246 that itself abuts a housing 269 of the blower motor 267. The housing 269 of the blower motor 267 defines an aperture 279 over which the speaker 244 and the speaker enclosure 246 are located. This arrangement allows the interior of the blower motor 267 to remain generally sealed off to the exterior environment, but allows the speaker 244 and the speaker enclosure 246 to be in fluid communication with the interior of the blower motor 267. The respiratory device 122 thus includes an enclosed air path between the speaker 244 and the interior of the blower motor 267.

The microphone 242 is configured to output sound data that can be stored in the memory device 114 and analyzed by the processor 112 of the control system 110. During operation of the respiratory system 120, the blower motor 267 will generate audible noise in the form of respiratory system-associated sound waves 292, often due to vibration as the blower motor 267 operates. The respiratory system-associated sound waves 292 created by the blower motor 267 can propagate out of the air inlet 262 of the respiratory device 122, where they can be heard by the user 210 and the bed partner 220. The noise can prevent the user 210 and the bed partner 220 from falling asleep, or can awaken the user 210 and the bed partner 220 when they have fallen asleep. Further, a portion of the noise from the blower motor 267 can also propagate to the air outlet 270 of the respiratory device 122.

The microphone 242 is positioned in the air inlet 262 so that it can detect the respiratory system-associated sound waves 292 from the blower motor 267. The microphone 242 outputs sound data representative of the respiratory system-associated sound waves 292 that can be stored in the memory device 114 and analyzed by the processor 112 of the control system 110. In turn, the control system 110 is configured to control the speaker 244 to emit matching sound waves that acoustically cancel out the respiratory system-associated sound waves 292. These speaker-associated sound waves 294 are illustrated in FIG. 7B. Thus, the processor 112 can analyze the sound data from the microphone 242 to determine the various characteristics of the respiratory system-associated sound waves 292, including amplitude and frequency.

The respiratory system-associated sound waves 292 may include multiple different amplitudes and multiple different frequencies, a single amplitude and multiple different frequencies, or a single amplitude and a single frequency. The control system 110 causes the speaker 244 to emit speaker-associated sound waves 294 that have substantially the same amplitudes and frequencies as the respiratory system-associated sound waves 292, but that are 180° out of phase with the respiratory system-associated sound waves 292. The speaker-associated sound waves 294 destructively interfere with the respiratory system-associated sound waves 292, which acoustically cancels the noise generated by the blower motor 267. Generally, each of the individual respiratory system-associated sound waves 292 will have one or more matching speaker-associated sound waves 294.

FIG. 7A shows the blower motor 267 during operation when the microphone 242 and the speaker 244 are not active. Because the speaker 244 is not emitting any speaker-associated sound waves 294 to acoustically cancel the respiratory system-associated sound waves 292, the respiratory system-associated sound waves 292 propagate through the air inlet 262, where they exit the respiratory device 122 and can be heard by the user 210 and the bed partner 220. The inset illustration shows the respiratory system-associated sound waves 292 being modeled as a sinusoidal wave. However, the actual respiratory system-associated sound waves 292 can take any form, which can include one or more sinusoidal waves, one or more non-sinusoidal waves, a combination of one or more sinusoidal waves and one or more non-sinusoidal waves, or any other types or combinations of sound waves.

FIG. 7B shows the blower motor 267 during operation when the microphone 242 and the speaker 244 are active. The speaker-associated sound waves 294 are modeled as a sinusoidal wave that has the same amplitude and frequency as the respiratory system-associated sound waves 292, but are 180° out of phase. The speaker-associated sound waves 294 destructively interfere with the respiratory system-associated sound waves 292, and thus the no sound waves exit the motor inlet 268A of the blower motor 267, as shown by the inset illustration. While the speaker-associated sound waves 294 are modeled as a sinusoidal wave, the speaker-associated sound waves 294 can have any form so as to match the respiratory system-associated sound waves 292. Thus, the speaker-associated sound waves 294 can include one or more sinusoidal waves, one or more non-sinusoidal waves, a combination of one or more sinusoidal waves and one or more non-sinusoidal waves, or any other types or combinations of sound waves.

While FIGS. 5A and 5B show the speaker 244 in close proximity to the blower motor 267 and show the speaker 244 directing the speaker-associated sound waves 294 toward the blower motor 267, the speaker 244 can have any number of suitable locations and orientations. Generally, so long as the speaker 244 is in fluid communication with the interior of the blower motor 267. For example, the speaker 244 could direct the speaker-associated sound waves 294 away from the interior of the blower motor 267. However, as long as the speaker 244 is in fluid communication with the blower motor 267 and/or the interior of the blower motor 267, the speaker-associated sound waves 294 can acoustically cancel the respiratory system-associated sound waves 292.

In some implementations of the present disclosure, the system 100 includes a maximum desired amount of noise attenuation. In some such implementations, for a noise having particular frequency, if such noise is attenuated too much, the system 100 may lose track of that particular frequency, which may result in a loss of control of the feedback loop required to cancel that particular frequency. Thus, to avoid such a loss of control, the system 100 can include one or more maximum levels of noise attenuation.

In some implementations, the system 100 includes one or more other microphones that can additionally or alternatively be used to detect noise associated with operation of the respiratory system 120. For example, system 100 could include one or more other microphones located at the air outlet 270, at any point along the conduit 126, at the intersection between the conduit 126 and the user interface 124, or near the face of the user 210. These other microphones can be used to detect noise in addition to or other than noise generated by the blower motor 267, such as air leaking out of the respiratory device 122, out of any location along the conduit 126, or out of the user interface 124. Further, in some implementations, microphone 242 can be used to detect the sound of leaks or other noises near the user interface 124 and/or the conduit 126.

In still other implementations, the feedback microphone 243 can be used monitor the system 100 and adjust the operation of the speaker 244. The feedback microphone 243 can be located near the user 210, and in some implementations, is generally located closer to the user 210 than the respiratory device 122. In some implementations, the feedback microphone 243 is coupled to the respiratory device 122. In some alternative implementations, the feedback microphone 243 is further from the user 210 than the respiratory device 122 (e.g., when the motor inlet 268A faces away from the user 210). The feedback microphone 243 is electrically coupled to the control system 110, and is configured to generate feedback sound data representative of any noise that reaches the user 210. The control system 110 can analyze the feedback sound data and adjust the speaker-associated sound waves 294 being emitted by the speaker 244 based on the feedback sound data. For example, if the feedback sound data indicates that a large amount of the respiratory system-associated sound waves 292 are reaching the user 210, the control system 110 can adjust the speaker-associated sound waves 294 to improve the noise cancellation and reduce the noise that is audible to the user 210. In some implementations, the feedback microphone 243 is additionally or alternatively used to detect noises near the user 210 from sources besides the operation of the blower motor 267, such as, for example, leaks from the user interface 124 or the conduit 126.

Figure 8:
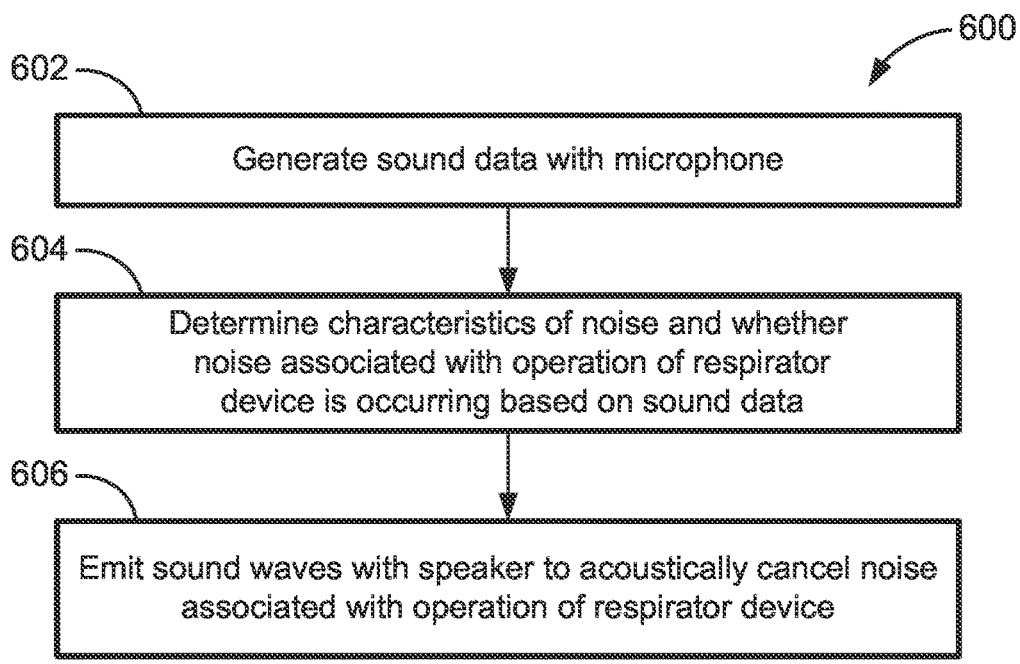
FIG. 8 is a process flow diagram for a first method of canceling noise generated during use of a respiratory system, according to some implementations of the present disclosure.

Referring to FIG. 8, a method 600 of canceling noise generated during use of a respiratory system (such as respiratory system 120) is illustrated. A memory device (such as memory device 114 of system 100) can be used to store machine-readable instructions and any type of data utilized in the steps of method 600. A control system (such as control system 110) can be used to execute the machine-readable instructions to cause the steps of method 600 to be performed. One or more of the steps of the method 600 described herein can be implemented using the system 100 (FIG. 1), and are described using the various components of the system 100. However, it is understood that the method 600 can be performed by appropriate systems other than system 100.

Step 602 of the method 600 includes generating sound data with the microphone 242. The microphone 242 is configured to generate the sound data in response to detecting that certain noises are occurring. Thus, as the respiratory system-associated sound waves 292 propagate to, through, and/or past the microphone 242, the microphone 242 generates sound data. The sound data generated by the microphone 242 includes data representative of various characteristics of the noise detected by the microphone 242. Thus, the microphone 242 can detect the respiratory system-associated sound waves 292 generated by the blower motor 267, and generate sound data representing the respiratory system-associated sound waves 292, including various amplitudes, frequencies, phases, etc.

Step 604 of the method 600 includes determining various characteristics of the noise detected by the microphone 242, and determining whether this noise is associated with operation of the respiratory system 120 and needs to be cancelled, based on the sound data generated by the microphone 242. The microphone 242 may be capable of detecting noises other than noises associated with the blower motor 267, for example background noises or any other noises. Based on the analysis of the sound data generated by the microphone 242, the control system 110 determines whether the sound data indicates that the respiratory system 120 is generating noise that needs to be acoustically cancelled.

As discussed above, the control system 110 is configured to identify the frequencies of all of the respiratory system-associated sound waves 292 generated by the respiratory system 120, and to determine the amplitudes of each individual sound wave in the respiratory system-associated sound waves 292. Based on the identified frequencies and amplitudes, the control system 110 can determine whether the noise that is detected by the microphone 242 needs to be cancelled. For example, the control system 110 determines whether the noise detected by the microphone 242 is associated with operation of the respiratory system 120, for example, whether the noise detected by the microphone 242 includes respiratory system-associated sound waves 292. In some implementations, the control system 110 determines whether the detected noise is sufficiently loud enough to warrant cancellation. In some implementations, the control system 110 determines whether the detected noise satisfies a threshold. In some such implementations, satisfying the threshold can be indicative of the detected noise being associated with a noise that is known to bother and/or annoy the user 210 and/or the bed partner 220.

Step 606 of the method 600 includes causing the speaker 244 to emit speaker-associated sound waves 294 to acoustically cancel the noise associated with operation of the respiratory system 120. Based on the analysis of the sound data generated by the microphone 242, the control system 110 causes the speaker 244 to emit speaker-associated sound waves 294 that destructively interfere with the respiratory system-associated sound waves 292 associated with operation of the respiratory system 120. Generally, for any sound wave detected by the microphone 242, the speaker 244 will emit a matching sound wave that has substantially the same amplitude and frequency, but is 180° out of phase (as illustrated, for example, in FIG. 7B). Thus, each sound wave associated with operation of the respiratory system 120 will be cancelled by a corresponding sound wave associated with the speaker. This cancellation prevents the respiratory system-associated sound waves 292 associated with operation of the respiratory system 120 from propagating towards the user 210 or the bed partner 220.

The system 100 is configured to act in a dynamic fashion, such that method 600 is continually being carried out so as to adjust to any changes in the noise associated with operation of the respiratory system 120. For example, if the blower motor 267 speeds up or slows down for any reasons, the noise generated by the blower motor 267 can change. The control system 110 is configured to continually adjust the sound waves emitted by the speaker 244 in response to the changing noise generated by the blower motor 267.

In some implementations, all of the noise that is generated by the blower motor 267 during operation of the respiratory system 120 is cancelled by the speaker-associated sound waves 294. In other implementations, only a portion of the noise that is generated by the blower motor 267 during operation of the respiratory system 120 is cancelled by the speaker-associated sound waves 294.

Method 600 can be utilized to detect and acoustically cancel any noises associated with operation of the respiratory system 120. For example, microphone 242 or additional microphones can be used to detect noises such as the user 210 breathing, or air leaking from the respiratory device 122, the user interface 124, or the conduit 126. The speaker 244 or additional speakers can be used to cancel these noises.

In some implementations, method 600 can also include receiving physiological data from the one or more sensors 130, such as respiration data related to the respiration of the user. The sound waves emitted by the speaker 140 can be based at least in part on this physiological data as well as the sound data.

Figure 9:
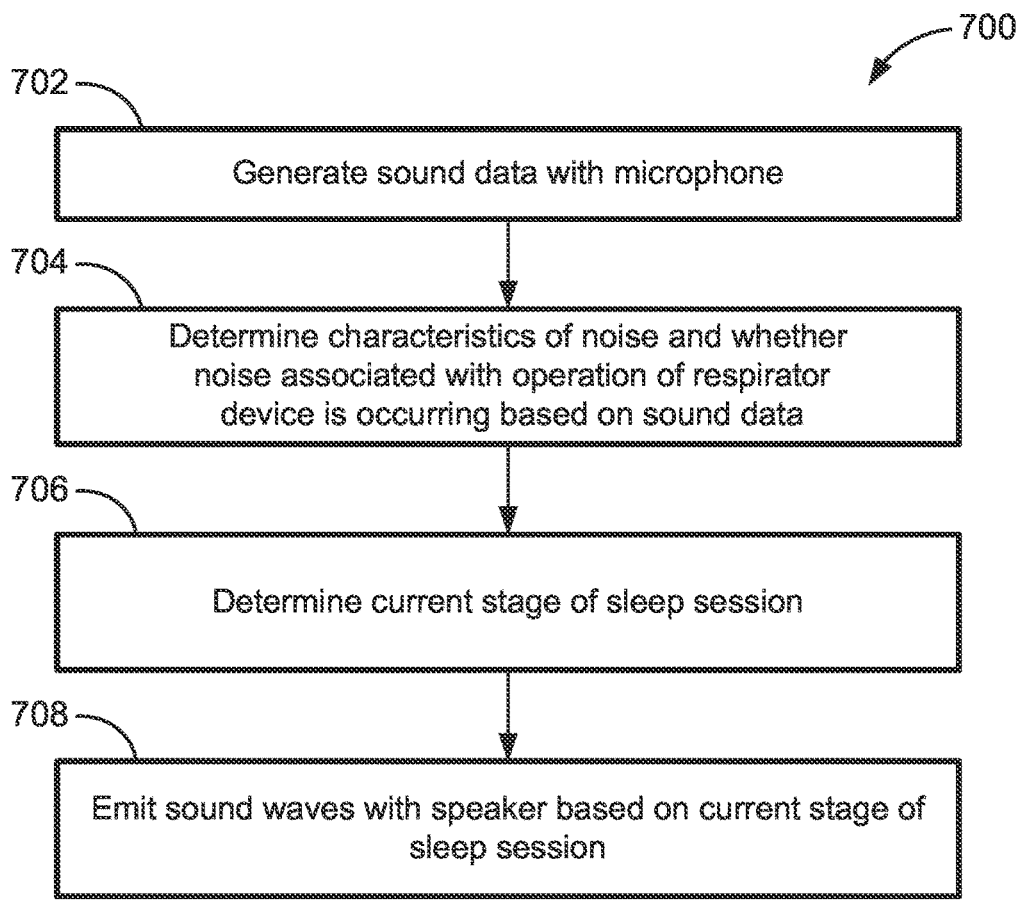
FIG. 9 is a process flow diagram for a second method of canceling noise generated during use of a respiratory system, according to some implementations of the present disclosure.

Referring to FIG. 9, a method 700 of canceling noise generated during use of a respiratory system (such as respiratory system 120) is illustrated. A memory device (such as memory device 114 of system 100) can be used to store machine-readable instructions and any type of data utilized in the steps of method 700. A control system (such as control system 110) can be used to execute the machine-readable instructions to cause the steps of method 700 to be performed. One or more of the steps of the method 700 described herein can be implemented using the system 100 (FIG. 1), and are described using the various components of the system 100. However, it is understood that the method 700 can be performed by appropriate systems other than system 100.

Step 702 of method 700 is generally similar to step 602 of method 600, and includes generating sound data with the microphone 242. The sound data generated by the microphone 242 includes data representative of various characteristics of any noise detected by the microphone 242. Step 704 of method 700 is generally similar to step 604 of method 600, and includes determining characteristics of the noise detected by the microphone 242 based on the sound data generated by the microphone 242, and determining whether this noise is associated with operation of the respiratory system 120.

Step 706 of method 700 includes determining the current stage of the sleep session of the user 210. As noted above, the sleep session includes multiple different types of sleep, including light sleep, deep sleep, and REM sleep. The sleep session also includes stages before and after the user 210 has fallen asleep, such as when the user 210 is attempting to fall asleep, or after the user 210 has woken up but has not removed the user interface 124. The control system 110 can determine the current stage of the sleep session in a variety of different manners. The respiration data and/or the sleep-related parameters discussed herein can be used to determine which stage of the sleep session the user 210 is currently in.

The control system 110 can also utilize a time elapsed since the beginning of the sleep session to assist in determining the current stage of the user 210 within the sleep session. For example, the control system 110 could determine that if a certain amount of time has passed since the beginning of the sleep session, the user 210 will be or is likely to be in REM sleep. The control system 110 could also use the current time to assist in determining the current stage of the sleep session. Generally, any of the techniques, devices, sensors, etc. discussed herein can be used to assist in determining which stage of the sleep session the user 210 is currently in.

Step 708 of method 700 includes causing the speaker 244 to emit speaker-associated sound waves 294 based on the determined current stage of the sleep session. For example, in one implementation, the control system 110 is configured to cause the speaker 244 to emit speaker-associated sound waves 294 that acoustically cancel as much noise from the respiratory system as possible during REM sleep. However, once the user 210 is no longer in REM sleep and is in a light sleep prior to waking up, the control system 110 can be configured to acoustically cancel less of the noise from the respiratory system, to assist in waking up the user 210. In other implementations, other stages of the sleep session can be used to modify the amount of noise cancellation achieved by the system 100.

Figure 10:
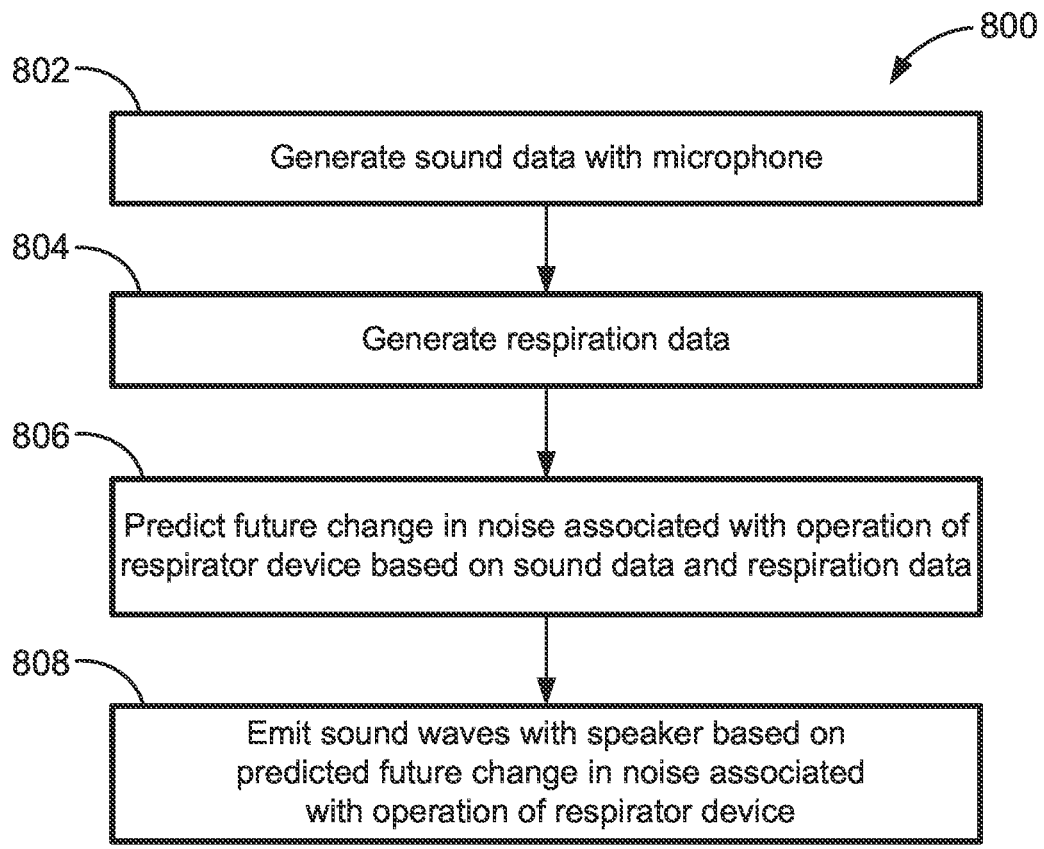
FIG. 10 is a process flow diagram for a third method of canceling noise generated during use of a respiratory system, according to some implementations of the present disclosure.

Referring to FIG. 10, a method 800 of canceling noise generated during use of a respiratory system (such as respiratory system 120) is illustrated. A memory device (such as memory device 114 of system 100) can be used to store machine-readable instructions and any type of data utilized in the steps of method 800. A control system (such as control system 110) can be used to execute the machine-readable instructions to cause the steps of method 800 to be performed. One or more of the steps of the method 800 described herein can be implemented using the system 100 (FIG. 1), and are described using the various components of the system 100. However, it is understood that the method 800 can be performed by appropriate systems other than system 100.

Step 802 of method 800 is generally similar to step 602 of method 600 and step 702 of method 700, and includes generating sound data with the microphone 242. The sound data generated by the microphone 242 includes data representative of various characteristics of any noise detected by the microphone 242.

Step 804 of method 800 includes generating respiration data with the air pressure sensor 32 and/or the flow rate sensor 34. As described herein, the air pressure sensor 32 and the flow rate sensor 34 can be used to generate respiration data or sleep-related parameters of the user 210, and parameters related to the operation of the respiratory system, such as a respiration signal, a respiration rate, an air flow rate through one or more portions of the respiratory system, etc.

Step 806 of method 800 includes predicting a future change in the noise associated with the operation of the respiratory system 120 based on the sound data, the respiration data (e.g., from the air pressure sensor 32 and/or the flow rate sensor 34), data related to the operation of the respiratory system 120, other data, or any combination thereof. By monitoring the various sensors (e.g., one or more of the one or more sensors 130) of the system 100 and analyzing the generated data, the control system 110 can predict future changes in the noise associated with the operation of the respiratory system 120. For example, in some implementations, a change in the respiration rate of the user 210 and/or the respiration signal of the user 210 may require a change in the operational speed of the blower motor 267 to maintain the desired pressure in the airway of the user 210. The change in the operational speed of the blower motor 267 generally increases or decreases the amount of noise generated by the blower motor 267 and/or changes the frequency and/or other characteristics of the noise associated with the blower motor 267 operation. The control system 110 can analyze the sound data and the sensor data to determine how respiration-related parameters and the air pressure in the respiratory device 122 effect the amount of noise generated by the blower motor 267. The control system 110 can then use this relationship to predict the future changes in the noise generated by the blower motor 267 if the respiration-related parameters or the air pressure change. The prediction of the future change in the noise level can also be based at least in part on data associated with the operation of the respiratory system 120, which could include current operating parameters (speed of the blower motor 267, humidity levels, etc.), physical characteristics of the respiratory system (e.g., a size of the blower motor 267, a number of blades of the blower motor 267), and others. The prediction could also be based at least in part on the current stage of the user 210 within the sleep session, or any other suitable factor.

In some implementations, the control system 110 utilizes historical data to aid in predicting the future change in the noise associated with operation of the respiratory system 120. In some implementations, the control system 110 analyzes the past noise generated by the blower motor 267 (or other components of the respiratory system) to help predict a future change in this noise. For example, the control system 110 can determine the sound being generated by the operation of the blower motor 267 increased in some manner during a given time period, which the control system 110 can use to aid in predicting that the future change is in an increased noise level.

Step 808 of method 800 includes causing the speaker 244 to emit speaker-associated sound waves 294 based at least in part on the predicted future change in the noise associated with the operation of the respiratory system 120. For example, if the control system 110 predicts that the noise generated by the blower motor 267 will soon increase, control system 110 can proactively modify the speaker-associated sound waves 294 to match the expected future respiratory system-associated sound waves 292. In this manner, any lag time between the blower motor 267 generating new sound waves and the speaker 244 emitting matching sound waves can be reduced or eliminated. The system 100 can thus prevent sudden spikes in the noise associated with the operation of the respiratory system 120.

Figure 11:
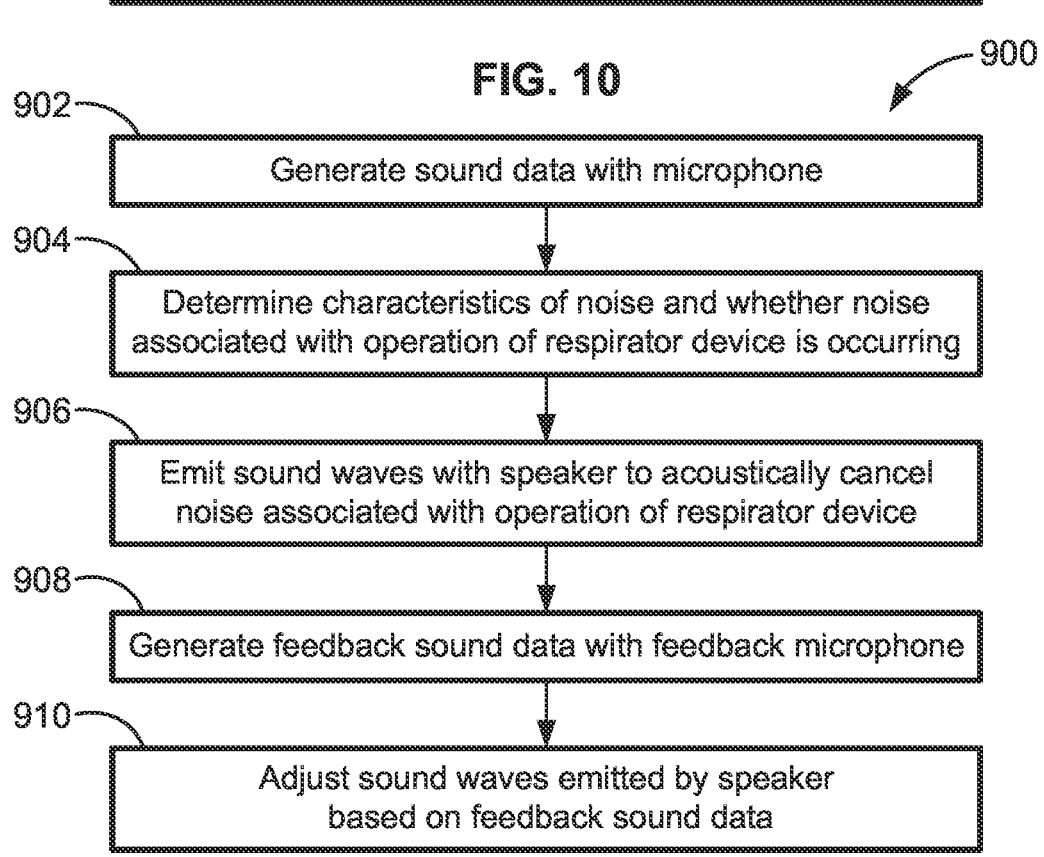
FIG. 11 is a process flow diagram for a fourth method of canceling noise generated during use of a respiratory system, according to some implementations of the present disclosure.

Referring to FIG. 11, a method 900 of canceling noise generated during use of a respiratory system (such as respiratory system 120) is illustrated. A memory device (such as memory device 114 of system 100) can be used to store machine-readable instructions and any type of data utilized in the steps of method 900. A control system (such as control system 110) can be used to execute the machine-readable instructions to cause the steps of method 900 to be performed. One or more of the steps of the method 900 described herein can be implemented using the system 100 (FIG. 1), and are described using the various components of the system 100. However, it is understood that the method 900 can be performed by appropriate systems other than system 100.

Step 902 of method 900 is generally similar to step 602 of method 600, step 702 of method 700, and step 802 of method 800, includes generating sound data with the microphone 242. The sound data generated by the microphone 242 includes data representative of various characteristics of any noise detected by the microphone 242. Step 904 of method 900 is generally similar to step 604 of method 600 and step 704 of method 700, and includes determining characteristics of the noise detected by the microphone 242 based on the sound data generated by the microphone 242, and determining whether this noise is associated with operation of the respiratory system 120. Step 906 of method 900 is generally similar to step 606 of method 600, and includes causing the speaker 244 to emit speaker-associated sound waves 294 to acoustically cancel the noise associated with operation of the respiratory system 120.

Step 908 of method 900 includes generating feedback sound data with the feedback microphone 243. The feedback microphone 243 is configured to generate feedback sound data in response to detecting any noise near the user 210. For example, the feedback microphone 243 detects any remaining respiratory system-associated sound waves 292 that are not cancelled by the speaker-associated sound waves 294.

Step 910 of method 900 includes adjusting the speaker-associated sound waves 294 emitted by the speaker 244 based at least in part on the feedback sound data. The feedback sound data generated by the feedback microphone 243 can be stored in the memory device 114 and analyzed by the control system 110. If the control system 110 determines that the respiratory system-associated sound waves 292 are not being sufficiently cancelled by the speaker-associated sound waves 294, the control system 110 can modify the sound waves being emitted by the speaker 244. This feedback process can be performed continuously during operation of respiratory system to ensure that the system 100 is always effectively canceling the noise generated by the respiratory system 120, or other noises.

For example, the analysis of the feedback sound data may indicate that certain frequencies of the respiratory system-associated sound waves 292 are not being cancelled, e.g., that the respiratory system-associated sound waves 292 include at least one sound wave that has a frequency not matched by any of the speaker-associated sound waves 294. The feedback sound data could show that a certain frequency or frequency band is not being cancelled, or could show the presence of a beat frequency indicating the presence of a mismatch. In either scenario, the control system 110 can modify the speaker-associated sound waves 294 by adjusting the frequency of at least one of the speaker-associated sound waves 294 to more closely match the frequencies of the respiratory system-associated sound waves 292, and improve the noise cancellation achieved by the system 100.

In other implementations, the analysis of the feedback sound data can be used to determine an amount of the respiratory system-associated sound waves 292 that have been acoustically cancelled by the speaker-associated sound waves 294. If the analysis indicates that the amount of cancelled noise from the respiratory system is less than a desired threshold amount (e.g., if the amount of noise generated by the blower motor 267 that reaches the feedback microphone 243 is louder than a maximum volume), the control system 110 can modify the speaker-associated sound waves 294 by increasing an amplitude of at least one of the speaker-associated sound waves 294.

In still other implementations, the analysis of the feedback sound data may indicate that the respiratory system-associated sound waves 292 are actually being amplified by the speaker-associated sound waves 294. This can occur if any of the speaker-associated sound waves 294 are in phase with any of the respiratory system-associated sound waves 292. In this scenario, the control system 110 can modify the speaker-associated sound waves 294 by adjusting the phase and/or amplitude of one or more of the speaker-associated sound waves 294.

In any of these scenarios, the control system 110 can incrementally modify the speaker-associated sound waves 294 based on the feedback sound data, and then continuously analyze updated feedback sound data to see if the modifications to the speaker-associated sound waves 294 were effective. For example, the control system 110 can incrementally adjust the frequency and/or phase of any of the speaker-associated sound waves 294 until the noise associated with operation of the respiratory system 120 has been sufficiently cancelled.

The present disclosure provides systems and method for cancellation of noise(s) using cancellation sounds. In some implementations, some detected noises are not cancelled, but masked by emitting a masking sound. The masking sound may not be designed to cancel the noise, but rather, the masking sounds hides and/or covers the noise to aid in reducing the impact of the noise on the user 210 and/or the bed partner 220. The masking noise can include white noise, pink noise, brown noise, soothing sounds, etc., or any combination thereof. In some implementations, the systems and methods of the present disclosure detect a first noise (noise from operation of the blower motor 267) and a second noise (e.g., noise from a mask leak) that is separate and distinct from the first noise. In some such implementations, the system 100 determines that the first noise is one that should be cancelled according to the methods described herein and that the second noise is one that should be masked. Generation of masking sounds can be implemented in any of methods 600, 700, 800, and 900.

Generally, any of methods 600, 700, 800, and 900 can be implemented using a system having a control system with one or more processors, and a memory storing machine readable instructions. The controls system can be coupled to the memory, and methods 600, 700, 800, and 900 can be implemented when the machine readable instructions are executed by at least one of the processors of the control system. Methods 600, 700, 800, and 900 can also be implemented using a computer program product (such as a non-transitory computer readable medium) comprising instructions that when executed by a computer, cause the computer to carry out the steps of methods 600, 700, 800, and 900.

One or more elements or aspects or steps, or any portion(s) thereof, from one or more of any of the claims below can be combined with one or more elements or aspects or steps, or any portion(s) thereof, from one or more of any of the other claims below or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations or alternative implementations according to aspects of the present disclosure may combine any number of features from any of the implementations described herein, such as, for example, in the alternative implementations described below.

What is claimed is:

1. A method for canceling noises generated by a respiratory system that is configured to supply pressurized air to a user during a sleep session, the method comprising:
    generating sound data using a microphone;
    generating, using one or more sensors, respiration data associated with respiration of the user of the respiratory system;
    analyzing the sound data to determine if noise associated with operation of the respiratory system is occurring;
    causing a speaker to emit sound waves based at least in part on (i) the sound data, (ii) the respiration data, (iii) data related to the operation of the respiratory system, or (iv) any combination of (i), (ii), and (iii), the emitted sound waves being configured to acoustically cancel at least a portion of the noise associated with operation of the respiratory system; and
    determining a current stage of the sleep session of the user based at least in part on (i) the sound data, (ii) the respiration data, or (iii) both, wherein the speaker is caused to emit the sound waves configured to acoustically cancel at least the portion of the noise associated with operation of the respiratory system when the user is in a first stage of the sleep session, and to acoustically cancel less of the noise associated with operation of the respiratory system when the user is in a second stage of the sleep session,
    wherein the first stage is a REM sleep stage and the second stage is a non-REM sleep stage, and wherein the user is asleep during both the REM sleep stage and the non-REM sleep stage.

2. The method of claim 1, wherein the second stage is a light sleep stage.

3. The method of claim 1, wherein the noise associated with the operation of the respiratory system is caused by (i) the supply of the pressurized air during the sleep session, (ii) the respiratory system generating the pressurized air during the sleep session, (iii) air leaking from a user interface during the sleep session, (iv) the user breathing during the sleep session, or (v) any combination of (i)-(iv).

4. The method of claim 1, wherein the sound waves emitted by the speaker are configured to destructively interfere with the noise associated with the operation of the respiratory system.

5. The method of claim 4, wherein the sound waves emitted by the speaker are 180 degrees out of phase with the noise associated with the operation of the respiratory system.

6. The method of claim 1, wherein the noise associated with the operation of the respiratory system includes one or more respiratory system-associated sound waves and the sound waves emitted by the speaker include one or more speaker-associated sound waves, each of the one or more speaker-associated sound waves corresponding to at least one of the one or more respiratory system-associated sound waves.

7. The method of claim 6, wherein each of the one or more speaker-associated sound waves and the corresponding respiratory system-associated sound wave of each of the one or more speaker-associated sound waves have substantially identical frequencies and amplitudes, and are 180 degrees out of phase with each other.

8. The method of claim 1, wherein at least a portion of the speaker is in fluid communication with at least a portion of the respiratory system.

9. The method of any claim 8, wherein the respiratory system includes a motor configured to supply the pressurized air, and wherein the speaker is coupled to a speaker enclosure such that the speaker is in fluid communication with at least one chamber of the motor.

10. The method of claim 9, wherein the respiratory system includes an enclosed air path between the speaker and the at least one chamber of the motor.

11. The method of claim 1, wherein the respiratory system includes a respiratory device, and wherein the microphone is positioned outside of the respiratory device and the speaker is positioned inside of the respiratory device.

12. The method of claim 1, wherein the respiratory system includes a respiratory device, and wherein the microphone is positioned in an air inlet of the respiratory device and the speaker is in fluid communication with an inner chamber of a blower motor of the respiratory system.

13. The method of claim 1, further comprising:
    receiving feedback sound data; and
    modifying, based at least in part on the received feedback sound data, the one or more sound waves emitted by the speaker.

14. The method of claim 13, further comprising:
    analyzing the feedback sound data to determine whether an amount of the noise associated with operation of the respiratory system that has been acoustically cancelled is less than a desired threshold amount; and
    modifying the one or more sound waves emitted by the speaker.

15. The method of claim 14, wherein the modifying includes increasing an amplitude of at least one of the one or more sound waves emitted by the speaker.

16. The method of claim 13, further comprising:
    analyzing the feedback sound data to determine whether the noise associated with operation of the respiratory system includes at least one sound wave having a frequency not matched by a frequency of any of the one or more sound waves being emitted by the speaker; and
    modifying the one or more sound waves emitted by the speaker.

17. The method of claim 16, wherein the modifying includes modifying a frequency of at least one of the one or more sound waves emitted by the speaker.

18. The method of claim 13, further comprising:
    analyzing the feedback sound data to determine whether the noise associated with operation of the respiratory system is being amplified by the one or more sound waves emitted by the speaker; and modifying the one or more sound waves emitted by the speaker.

19. The method of claim 18, wherein the modifying includes incrementally shifting a phase of at least one of the one or more sound waves being emitted by the speaker.

20. The method of claim 13, further comprising:
continually receiving the feedback sound data;
incrementally modifying the one or more sound waves being emitted by the speaker;
receiving additional feedback sound data; and
further modifying the one or more sound waves being emitted by the speaker.

21. The method of claim 13, wherein the modification includes (i) a phase of at least one of the one or more sound waves emitted by the speaker, (ii) a frequency of at least one of the one or more sound waves emitted by the speaker, (iii) an amplitude of at least one of the one or more sound waves emitted by the speaker, or (iv) any combination of (i), (ii), and (iii).

22. The method of claim 13, wherein the feedback sound data is generated by a feedback microphone.

23. The method of claim 22, wherein the feedback microphone is positioned closer to the user than to the speaker.

24. The method of claim 1, further comprising causing the speaker to emit one or more sounds waves configured to form a masking sound, the masking sound aiding in preventing the noise associated with the operation of the respiratory system from waking up the user.

25. The method of claim 24, wherein the masking sound includes white noise, pink noise, brown noise, soothing sounds, or any combination thereof.

26. The method of claim 1, further comprising:
analyzing the sound data to identify a first noise associated with operation of the respiratory system and a second noise associated with operation of the respiratory system; and
causing the speaker to emit sounds waves configured to acoustically cancel only the first noise and not the second noise.

27. The method of claim 1, wherein the respiration data includes a respiration signal of the user for at least a portion of the sleep session, a respiration rate of the user for at least a portion of the sleep session, or both.

28. The method of claim 1, wherein the respiratory system includes a motor configured to supply the pressurized air, and wherein the data related to the operation of the respiratory system includes a speed of the motor, a number of blades of the motor, or both.

29. A method for canceling noises generated by a respiratory system that is configured to supply pressurized air to a user during a sleep session, the method comprising:
generating sound data using a microphone;
generating, using one or more sensors, respiration data associated with respiration of the user of the respiratory system;
analyzing the sound data to determine if noise associated with operation of the respiratory system is occurring;
causing a speaker to emit sound waves based at least in part on (i) the sound data, (ii) the respiration data, (iii) data related to the operation of the respiratory system, or (iv) any combination of (i), (ii), and (iii), the emitted sound waves being configured to acoustically cancel at least a portion of the noise associated with operation of the respiratory system;
predicting a future change in the noise associated with operation of the respiratory system based at least in part on (i) the sound data, (ii) the respiration data, (iii) the data related to the operation of the respiratory system, or (iv) any combination of (i), (ii), and (iii); and
modifying the sound waves emitted by the speaker based at least in part on the predicted future change in the noise associated with operation of the respiratory system.

30. The method of claim 29, further comprising analyzing historical data associated with past noise generated during operation of the respiratory system, and wherein the predicting the future change is based at least in part on the historical data associated with past noise.

31. The method of claim 30, wherein the past noise is generated earlier in the sleep session, or during a prior sleep session.

32. The method of claim 29, wherein the modifying the sound waves is based at least in part on (i) respiration data related to respiration of the user of the respiratory system, (ii) data related to the operation of the respiratory system, (iii) the sound data generated by the microphone, or (iv) any combination of (i), (ii), and (iii).

* * * * *